(12) United States Patent
Beck et al.

(10) Patent No.: US 7,390,540 B2
(45) Date of Patent: Jun. 24, 2008

(54) METHOD FOR PREPARATION OF ANISOTROPIC MATERIALS

(75) Inventors: Patricia A. Beck, Palo Alto, CA (US); Sean Zhang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 317 days.

(21) Appl. No.: 10/896,182

(22) Filed: Jul. 21, 2004

(65) Prior Publication Data

US 2006/0016516 A1      Jan. 26, 2006

(51) Int. Cl.
*C09K 19/00* (2006.01)
*C08G 63/195* (2006.01)

(52) U.S. Cl. .................. 428/1.2; 428/1.31; 428/345; 528/87; 528/98; 528/100; 528/104; 528/110

(58) Field of Classification Search .............. 428/1.31, 428/345, 928, 929, 1.2; 252/299.1, 299.67, 252/583; 528/87, 100, 110, 98, 104
See application file for complete search history.

(56) References Cited

U.S. PATENT DOCUMENTS

| | | | | |
|---|---|---|---|---|
| 4,683,327 A | * | 7/1987 | Stackman | 560/86 |
| 4,892,392 A | * | 1/1990 | Broer | 349/124 |
| 4,983,479 A | * | 1/1991 | Broer et al. | 430/20 |
| 5,178,710 A | * | 1/1993 | Hikmet et al. | 156/272.2 |
| 6,613,246 B2 | * | 9/2003 | Takeuchi et al. | 252/299.67 |
| 7,091,412 B2 | * | 8/2006 | Wang et al. | 174/391 |

FOREIGN PATENT DOCUMENTS

| EP | 0331233 | 9/1989 |
|---|---|---|
| WO | WO 01/37360 | 5/2001 |

OTHER PUBLICATIONS

Kornilovitch—"Molecular Electronics and Resistance of Molecule-Metal Interface"—The Institution of Electrical Engineers—2003.
Wang et al—"Electrical Characteristics of Metal-Molecule-Silicon Junctions"—The Institution of Electrical Engineers—2003.

\* cited by examiner

*Primary Examiner*—Randy Gulakowski
*Assistant Examiner*—Olga Asinovsky

(57) ABSTRACT

Various embodiments of the present invention are directed to methods for manufacturing complex, anisotropic materials with desirable properties for information storage, processing, and display. Certain of these methods involve employing a magnetic field during manufacture to induce desired orientations of precursors, subunits, and/or molecular subassemblies. The applied magnetic field steers the precursors, subunits, and/or molecular subassemblies into desirable orientations while the precursors, subunits, and/or molecular subassemblies are assembled or self-assemble into a complex, anisotropic material. One embodiment of the present invention is a class of new, complex, well-ordered, network-like materials that include a ferromagnetic-material-based framework in which organic and/or organometallic compounds are organized. The ferromagnetic-molecule-based framework provides a scaffold for assembling the stable, precisely separated layers of organic and/or organometallic compounds and maintaining the layers of organic and/or organometallic compounds in well-ordered, anisotropic arrangements. Additional embodiments of the present invention are directed to methods for manufacturing the new ferromagnetic-molecule-based, network-like materials.

7 Claims, 17 Drawing Sheets

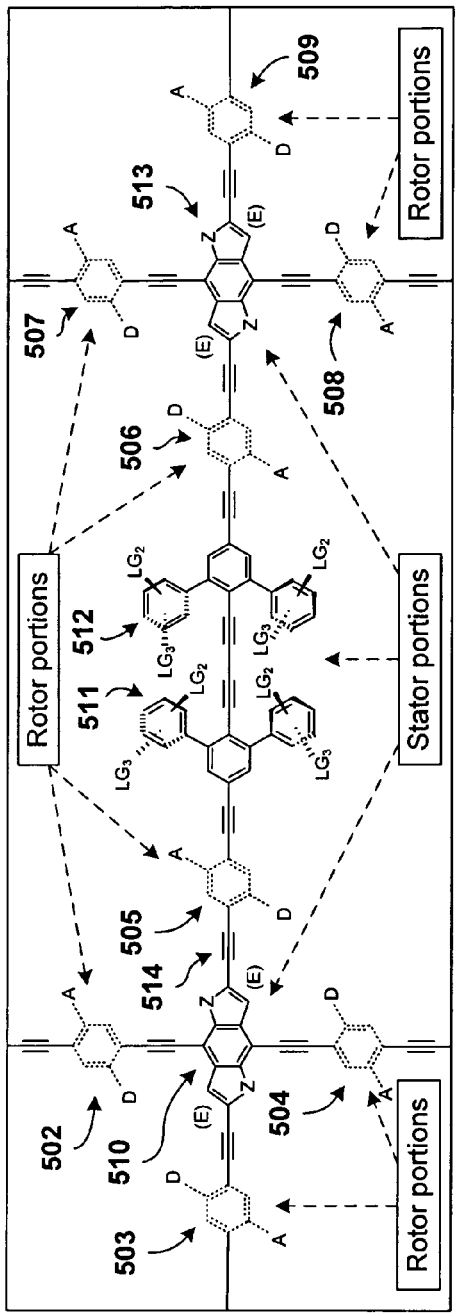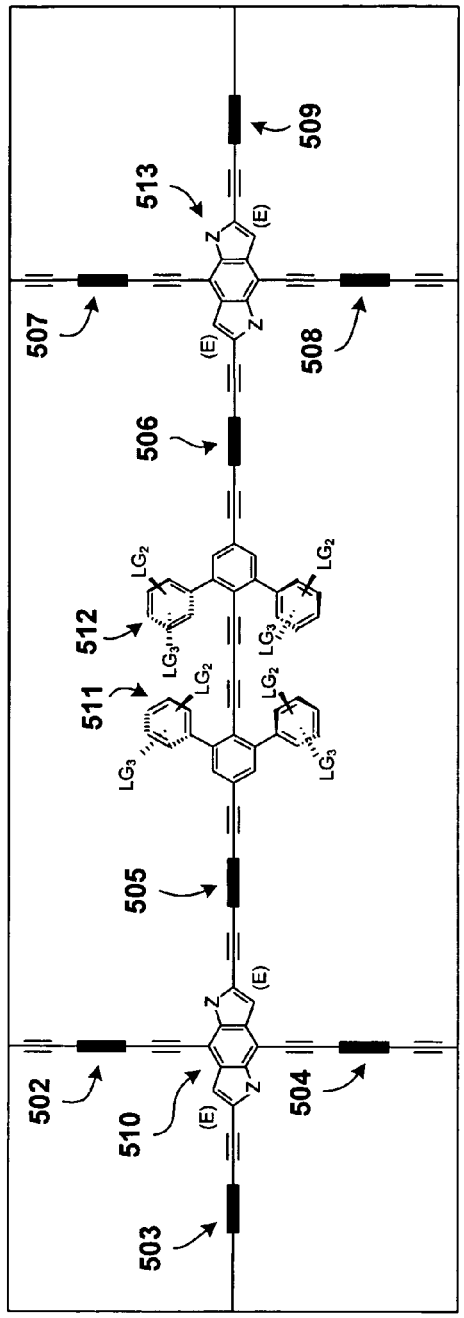
Figure 5
Figure 6

METHOD FOR PREPARATION OF ANISOTROPIC MATERIALS

TECHNICAL FIELD

The present invention is related to molecular electronics, optoelectronics, data storage, information display and, in particular, to a new class of anisotropic materials, and methods for producing these anisotropic materials, that exhibit useful and desirable properties, including properties useful for storage, processing, and display of information.

BACKGROUND OF THE INVENTION

Significant research and development effort is currently being applied to produce various types of extremely dense materials with useful electronic, magnetic, and/or optical properties, which find particular use in information storage, processing, and display applications. For example, research efforts are currently directed towards developing bi-stable optoelectronic materials with molecular rotors that can be placed in several stable positions with respect to a rigid molecular framework, and can consequently store a bit of information within a region of the material limited in size only by the cross-section of a light beam used to access the bit of information. In future materials, a bit of information may be stored in the orientation or electronic state of a single, asymmetrical molecule, or even in the spin state of a trapped subatomic particle. Molecular electronics may enable not only extremely dense storage of information, but may also yield an enormous decrease in power consumption, a decreased need for heat dissipation, and an increase in the speed by which the physical states that encode logical memory values can be altered, or switched. To the extent that molecular-electronic components can be coaxed to self-aggregate from precursors, subunits, or readily synthesized molecular subassemblies, manufacturing costs per bit greatly decrease.

Unfortunately, as with most things, the spectacular advantages potentially provided by molecular electronics may be achieved only after various problems are overcome. Many of the new materials theoretically useful in information storage, processing, and display applications are manufactured by sandwich-like assembly of organic and organometallic compounds into molecular-film layers on a substrate to produce a complex, multi-layered material. In many of these materials, the desirable properties useful for information storage and display accrue from an ability to orient molecular subassemblies, such as molecular rotors, within the materials in particular directions, using electric fields. However, reliable and robust manufacture of the layered molecular materials, in many cases, remains elusive, and, in many other cases, the stacking and orientations of molecular layers may be disrupted or destroyed by repeated electronic access to information stored within them. For these reasons, research scientists, technologists, manufacturers, and system designers have recognized the need for improved methods of manufacturing layered materials and for new, layered materials that do not suffer deterioration or destruction when electrically, optically, or magnetically accessed.

SUMMARY OF THE INVENTION

Various embodiments of the present invention are directed to methods for manufacturing complex, anisotropic materials with desirable properties for information storage, processing, and display. Certain of these methods involve employing a magnetic field during manufacture to induce desired orientations of precursors, subunits, and/or molecular subassemblies. The applied magnetic field steers the precursors, subunits, and/or molecular subassemblies into desirable orientations while the precursors, subunits, and/or molecular subassemblies are assembled or self-assemble into a complex, anisotropic material. One embodiment of the present invention is a class of new, complex, well-ordered, network-like materials that include a ferromagnetic-material-based framework in which organic and/or organometallic compounds are organized. The ferromagnetic-molecule-based framework provides a scaffold for assembling the stable, precisely separated layers of organic and/or organometallic compounds and maintaining the layers of organic and/or organometallic compounds in well-ordered, anisotropic arrangements. Additional embodiments of the present invention are directed to methods for manufacturing the new ferromagnetic-molecule-based, network-like materials. In alternative embodiments, an applied electrical field, or other applied field, force, or directed electromagnetic radiation is employed to orient precursors, subunits, and/or molecular subassemblies during manufacture.

BRIEF DESCRIPTION OF THE DRAWINGS

FIGS. 5 and 6 illustrate the coplanar and approximately 90-degree-from-coplanar rotational states of a two-dimensional optical state-change organic polymer, an acetylene-inked, indacene-and-substituted-benzene polymer network, at the chemical-subunit level.

DETAILED DESCRIPTION OF THE INVENTION

Figure 1:
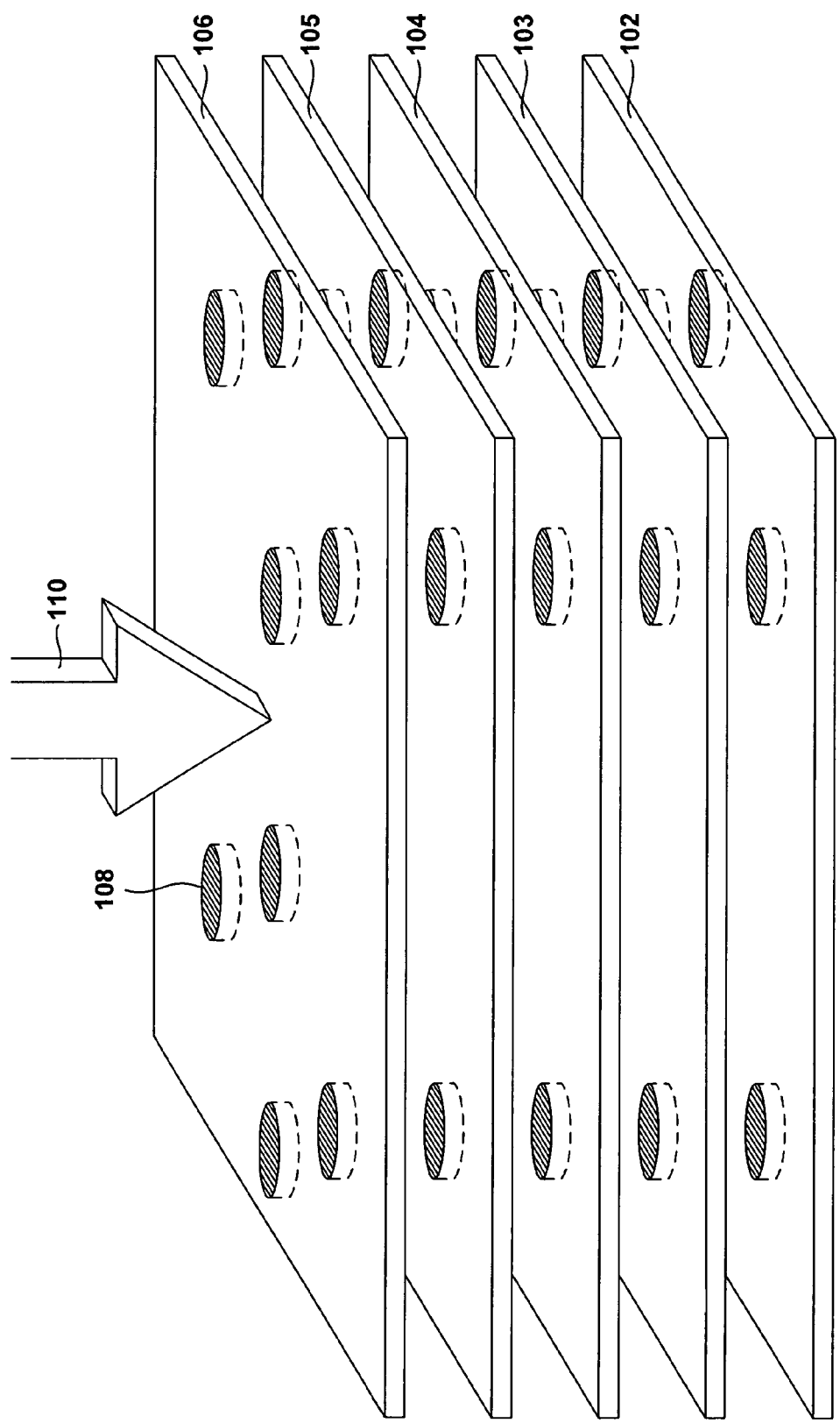
FIG. 1 abstractly illustrates a small, rectangular section of a larger, two-dimensional, optical state-change organic-polymer film.

Embodiments of the present invention are directed to preparation of complex, anisotropic materials with desirable magnetic, electronic, and optical properties for information storage, processing, and display applications. The present invention is discussed, below, with respect to a number of detailed, exemplary methods and materials. However, the method embodiments of the present invention are applicable to a wide range of different complex, anisotropic materials, including layered and network-like materials, with localized orientation, magnetic, and/or electronic states that can be exploited for information storage, processing, and/or display.

In a first example, a class of 2-dimensional, electro-optical, state-change, organic-polymer material is described, followed by a description of new material with more desirable properties. Various 2-dimensional, electro-optical, state-change, organic-polymer materials of the class employ different types of acetylene-coupled, highly conjugated, two-dimensional polymers of organic dye subunits that include a relatively rigid, planar network of plate-like, fused-ring dye subunits with interleaving, acetylene-linked, substituted phenyl components that may be rotated, under the influence of an applied electrical field, with respect to the relatively rigid, fused-ring network. When the rotatable, phenyl components of the two-dimensional film are coplanar with the fused-ring-based, relatively rigid, planar network, the entire two-dimensional polymer is fully conjugated, with concomitant delocalization of $\pi$ electrons throughout the polymer. In a fully conjugated two-dimensional polymer, the molecular-orbital bands are relatively broad, in energy, and relatively closely spaced, and there is a relatively small energy gap between the highest occupied molecular orbital ("HOMO") and the lowest unoccupied molecular orbital ("LUMO"). The components of the two-dimensional polymer may be designed so that this relatively low energy gap between the HOMO and LUMO corresponds to absorption of visible light of a particular color, or range of colors. However, when an electrical field is applied to rotate the phenyl components with respect to the relatively rigid, fused-ring-based network within the two-dimensional polymer, full conjugation of $\pi$ electrons within the two-dimensional polymer is disrupted, resulting in narrowing of molecular orbital bands of the two-dimensional polymer and an increase in the energy gap between the HOMO and LUMO. This results in essentially blue-shifting the absorption characteristics of the two-dimensional polymer and, when the energy gap corresponds to ultra-violet or more energetic wavelengths, results in a transparent film.

A locally applied electrical field may be used to locally and reversibly change the organic-polymer film between a colored, visible light-absorbing state and a transparent state. In alternative embodiments, electromagnetic radiation of different wavelengths may be absorbed and transmitted by the organic polymer film in each of multiple states that can be obtained by application of an electrical field. The optical states of the organic polymer are theoretically stable over long periods of time, even when the applied electrical field is removed. Therefore, the two-dimensional polymer is a candidate for use as an information-storage medium within an information-storage device, with the transparent state representing one binary value, such as the binary value "0," and the colored, visible-light-absorbing state representing the other binary value, for example, the binary value "1." Because the optical states of the polymer depend on molecular-subunit orientations within the two-dimensional information-storage organic-polymer film, the size of a discrete, binary-value-storing region of the memory polymer is limited only by the smallest size over which an electrical field or optical illumination can be reproducibly applied by an optoelectronic-mechanical read/write device.

An optoelectronic-mechanical read/write device can be used to write binary values into small areas of the information-storage layer that represent individual bits by applying an electrical field in a first direction to write "0" bit values by inducing transparent optical states and applying an electrical field in a second direction to write "1" bits by inducing visible-light-absorbing-and/or-reflecting optical states. As one example, a photodiode layer beneath the information-storage layer within an information-storage medium allows the contents of the information-storage layer to be read. When visible light is guided through the read/write device onto the information-storage medium, the light is absorbed by visible-light-absorbing-and/or-reflecting regions and transmitted by transparent regions of the information-storage layer. The underlying photodiode layer is not activated below visible-light-absorbing-and/or-reflecting regions of the information-storage polymer, but is activated by light transmitted to transparent regions of the information-storage polymer. When activated, the photodiode layer produces an electric current, and thus the stored information within the information-storage layer can be transformed into digital electric signals. As another example, a reflective layer below the information-storage layer within an information-storage medium may reflect or not reflect an incident electromagnetic-radiation beam depending on whether the beam is absorbed or transmitted by the information-storage medium, and the reflected beam sensed by a photodiode in a read/write assembly. Multichannel information storage may be provided by using an information-storage polymer with multiple states with different absorption/transmission characteristics, and use of different wavelengths of data-accessing electromagnetic radiation.

FIG. 1 abstractly illustrates a small, rectangular section of a larger, two-dimensional, optical state-change organic-polymer film. As shown in FIG. 1, the optical state-change organic polymer material is composed of numerous, parallel, sheet-like two-dimensional organic polymers 102-106. The two-dimensional sheet-like organic polymers include relatively rigid, planar networks in which rotatable molecular components, such as rotatable molecular component 108, occur at regular intervals in both dimensions. These rotatable, molecular components may be rotationally oriented to be coplanar with the relatively rigid, two-dimensional organic polymer sheets, as shown in FIG. 1, when electrical field, represented by arrow 110 in FIG. 1, is applied in a first direction.

Figure 2:
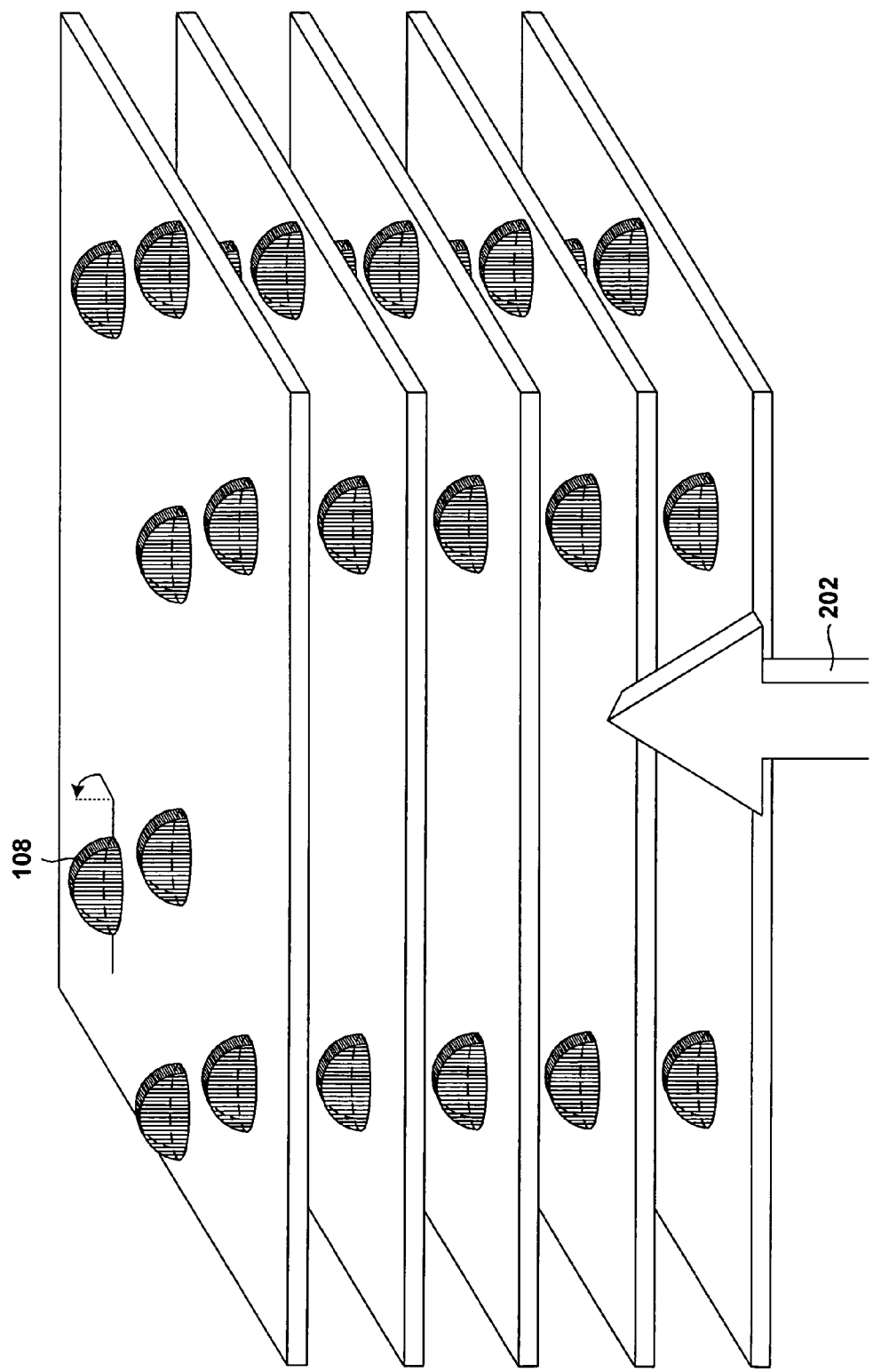
FIG. 2 abstractly shows the two-dimensional, optical state-change organic-polymer film shown in FIG. 1 when the direction of the applied electrical field is reversed.

FIG. 2 shows the two-dimensional, optical state-change organic-polymer film shown in FIG. 1 when the direction of the applied electrical field is reversed. As shown in FIG. 2, when the direction of the applied electrical field, represented by arrow 202, is reversed, the rotatable molecular components, such as rotatable molecular component 108, are rotated approximately 90 degrees with respect to the planes of the relatively rigid, two-dimensional optical state-change organic polymer. The two-dimensional optical state-change organic polymer may be in a colored, visible-light-absorbing-and/or-reflecting optical state when the rotatable molecular components are parallel with the two-dimensional polymer sheets, as shown in FIG. 1, and may be in a transparent optical state when the rotatable molecular components are approximately perpendicular to the plane of the two-dimensional organic polymer sheets, as shown in FIG. 2.

It should be noted that the directions of the applied electrical fields used to rotate rotatable molecular components of the two-dimensional polymers may be coplanar with the two-dimensional polymers, as shown in FIGS. 1-4, may be approximately orthogonal to the planes of the two-dimensional polymers, or may be applied at various angles with respect to the planes of the two-dimensional polymers, depending on the chemical nature and relative locations of the rotatable molecular components within the two-dimensional optical state-change organic polymer.

Figure 3:
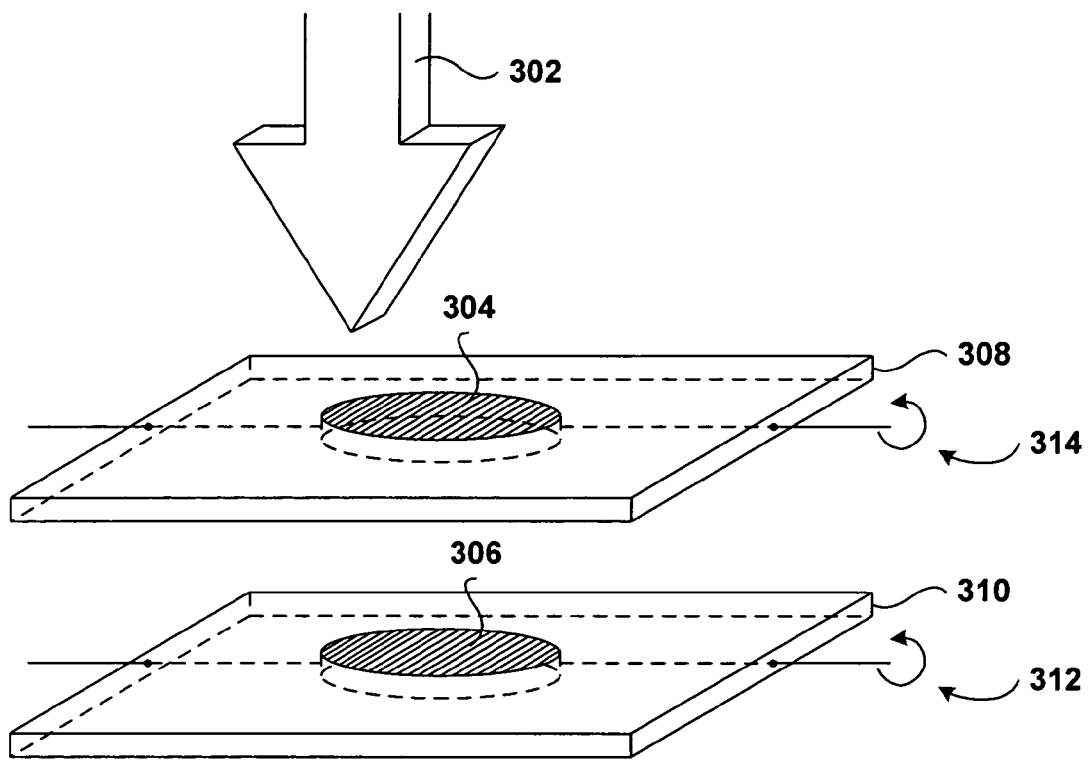
FIGS. 3 and 4 illustrate rotation of rotatable molecular components of the two-dimensional, optical state-change organic-polymer film under an applied electrical field at a larger scale.
Figure 4:
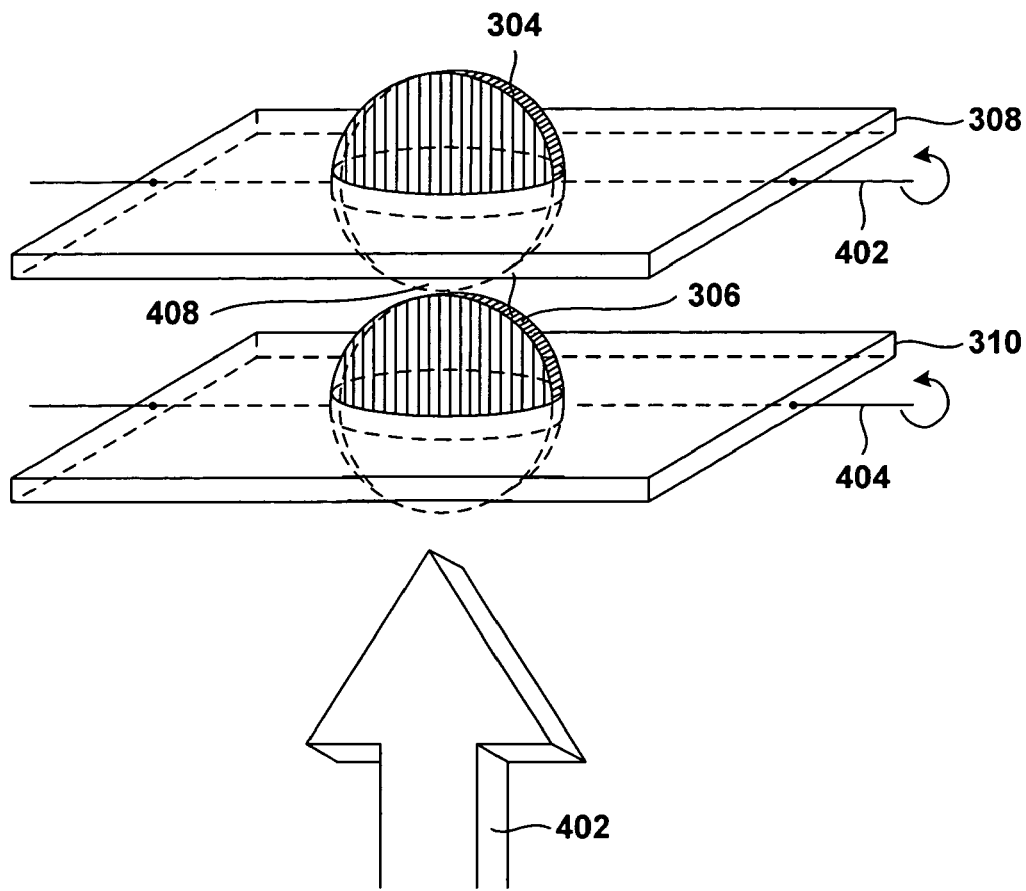

FIGS. 3 and 4 illustrate rotation of rotatable molecular components of the two-dimensional, optical state-change organic-polymer film under an applied electrical field at a larger scale. In FIG. 3, the applied electrical field 302 has caused the rotatable molecular components 304 and 306, to be oriented coplanar with the planes of the two-dimensional organic polymers 308 and 310 in which they are included. The applied electrical field 302 serves to rotate the rotatable molecular components into a coplanar position. However, when the field is then removed, the rotatable molecular components are relatively stably fixed in the coplanar orientation as a result of molecular interactions between chemical substituents of the rotatable molecular components and the relatively rigid, static portion of the two-dimensional optical state-change organic polymers. When, however, the electrical field is reversed, as shown by arrow 402 in FIG. 4, rotatable molecular components 304 and 306 rotate about horizontal rotation axes 402 and 404, respectively, to positions in which the planes of the rotatable molecular components are approximately perpendicular to the plane of the relatively rigid, two-dimensional organic polymer sheets 308 and 310. In FIG. 3, the applied electrical field 302 would, without various molecular constraints, cause the rotatable molecular components 304 and 306 to rotate a full 180 degrees about rotation axes 312 and 314, respectively, to end up approximately orthogonal to the relatively rigid, two-dimensional organic polymer planes 308 and 310, respectively. However, various intramolecular forces conspire to lock the rotatable, molecular components 304 and 306 into the coplanar positions shown in FIG. 3. In the stacked two-dimensional polymers within the two-dimensional optical state-change organic-polymer film, interactions between substituents of the rotatable, phenyl components of one two-dimensional polymer with substituents of one or more rotatable molecular components of a lower or higher, neighboring two-dimensional polymer and/or with chemical groups incorporated into the relatively rigid, fused-ring two-dimensional network of the two-dimensional polymer or lower or higher neighboring two-dimensional polymers may conspire to stably lock the rotatable molecular components into approximately orthogonal positions with respect to the planes of the two-dimensional polymers. The intramolecular and intermolecular interactions that lock the rotatable molecular components into rotational orientations may include hydrogen bonding, dipole-dipole interactions, interactions based on Van der Waals forces, ability to polarize relatively weakly bonded electrons, steric repulsions, and other such forces that serve to constrain the possible rotational confirmations of the rotatable molecular components within the stacked two-dimensional polymers that together compose an organic-polymer-based optical state-change film.

FIGS. 5 and 6 illustrate the coplanar and approximately 90-degree-from-coplanar rotational states of a two-dimensional optical state-change organic polymer, an acetylene-inked, indacene-and-substituted-benzene polymer network, at the chemical-subunit level. As shown in FIG. 5, in the visible-light-absorbing-and/or-reflecting, coplanar state, the rotatable phenyl components 502-509 that are rotatably linked to larger, fused-ring dye subunits 510-513 through acetylene linkages, such as acetylene linkage 514, are coplanar with the fused-ring, relatively rigid, planar subunits 510-513. The rotatable phenyl components 502-508 have asymmetric substituents designated in FIG. 5 by the letters "A" and "D." These asymmetrical substituents introduce a relatively large, electrical dipole within the rotatable, phenyl subunits, making the rotatable phenyl subunits susceptible to orientation by applied electrical fields. The coplanar rotational orientations of the rotatable phenyl subunits 502-509 in FIG. 5 are stabilized by various intermolecular interactions, including dipole-dipole interactions, hydrogen bonding, and other such attractive forces. In the coplanar configuration illustrated in FIG. 5, the two-dimensional polymer is essentially fully conjugated, with double and triple carbon bonds alternating with single carbon bonds along the horizontal and vertical backbones of the two-dimensional polymer. In this fully conjugated state, the molecular orbital bands that describe the electronic state of the polymer are broad and relatively closely spaced. The relatively small energy gap between the HOMO and LUMO, in turn, represents the minimum energy for an electronic transition within the two-dimensional optical state-change organic polymer in response to absorption of a photon of visible light. The two-dimensional optical state-change organic polymer may be chemically tailored in order to produce an organic film with specific properties, such as light-absorption characteristics at various wavelengths.

When an electrical field, of opposite polarity to that applied in order to establish the coplanar configuration shown in FIG. 5, is applied to the two-dimensional optical state-change organic polymer, the rotatable phenyl subunits 502-509 rotate approximately 90 degrees with respect to the relatively rigid, fused-ring subunits 510-513, as shown in FIG. 6. In this rotated configuration, the two-dimensional optical state-change organic polymer is no longer fully conjugated, since the planer π-bonds of the rotatable molecular components 502-509 are no longer coplanar with the conjugated planar π-bonding molecular orbitals of the relatively rigid, two-dimensional optical state-change polymer network that includes fused-ring subunits 510-513.

As discussed above, with reference to FIGS. 3-4, the two-dimensional optical state-change organic polymer is bistable. Although rotation of the rotatable phenyl subunits 502-509 is induced by application of an electrical field, once rotated to the coplanar or approximately perpendicular positions shown in FIGS. 5 and 6, respectively, the rotatable phenyl subunits remain fixed in either the coplanar or approximately perpendicular positions for long periods of time, even when application of the electrical field is discontinued. The two, bistable orientations of the rotatable phenyl subunits arise from two different sets of intramolecular and intermolecular actions between phenyl substituent groups and substituent groups of other rotatable phenyl subunits and other chemical components of the two-dimensional optical state-change organic polymer. Moreover, as discussed above, the bistable states are locally stable within extremely small regions of the optical state-change organic polymer, including regions of nanometer dimensions. Finally, the optical contrast between the two bistable states can be tailored to be extremely high, facilitating accurate and robust access to stored information, as discussed below.

Although, in principle, the above-described two-dimensional optical state-change organic polymer should be straightforward to manufacture, and should produce a useful, information-storing material that can be reliably and repeatedly accessed indefinitely, it turns out that, for various reasons, both manufacture and use of the material are problematic. In fact, the largely two-dimensional synthetic procedure would be expected to be conducive to well-structured layering of two-dimensional sheets within the material, well-ordered layering has proven more difficult to obtain than expected. Puckering, folds, entanglements, and more severe discontinuities and irregularities result in a less-than-well-ordered, layered structure. Unfortunately, unless the bulk of the layers of the two-dimensional optical state-change organic polymer are well-ordered, the cumulative state-change of the rotors induced by electrical fields cannot be easily and reliably detected. Furthermore, it has been observed that application of electrical fields to induce state changes can, at the same time, induce bulk dislocations of the two-dimensional optical state-change organic polymer within the material. Therefore, repeated state changes can lead to a useless, disordered material. Another problem is that the separation between layers may be locally non-uniform, resulting in an inability of the rotors in too-closely-spaced layers to rotate about the pair of single bonds that rotatably fix them within the molecular framework In materials that provide bi-stable electronic states, even relatively small departures from a crystal-like internal ordering of molecular components may readily lead to inaccessibility of one or more electronic states.

Figure 7:
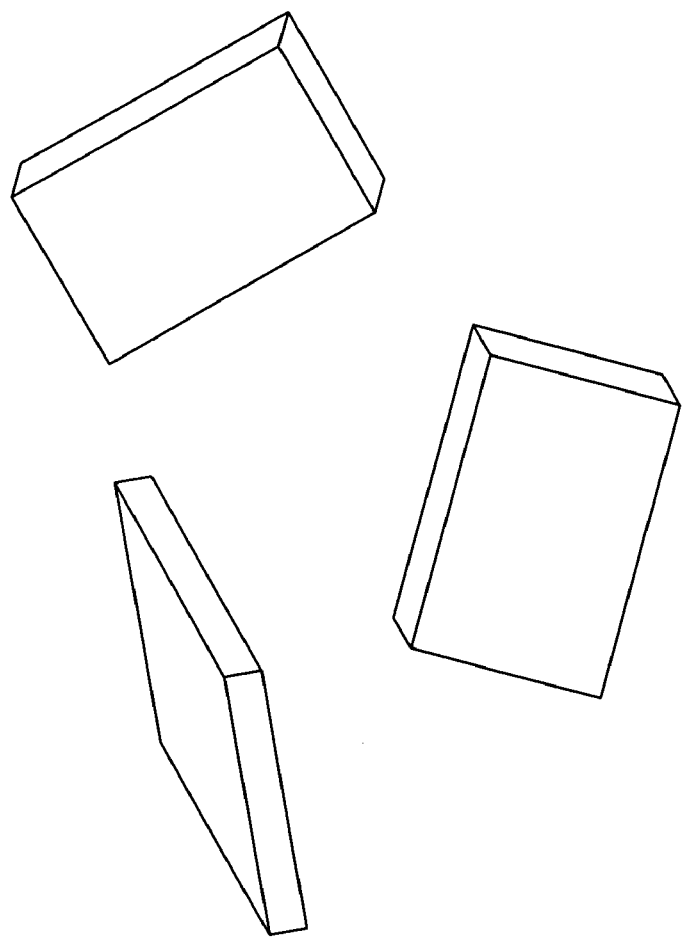
FIGS. 7 and 8 illustrate assembly or self-assembly of a complex, anisotropic material.
Figure 7:
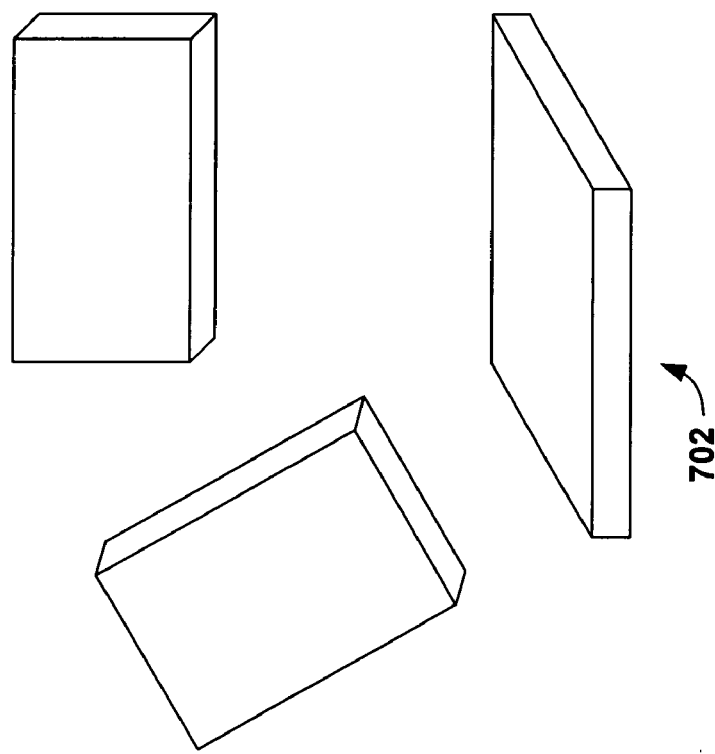
Figure 8:
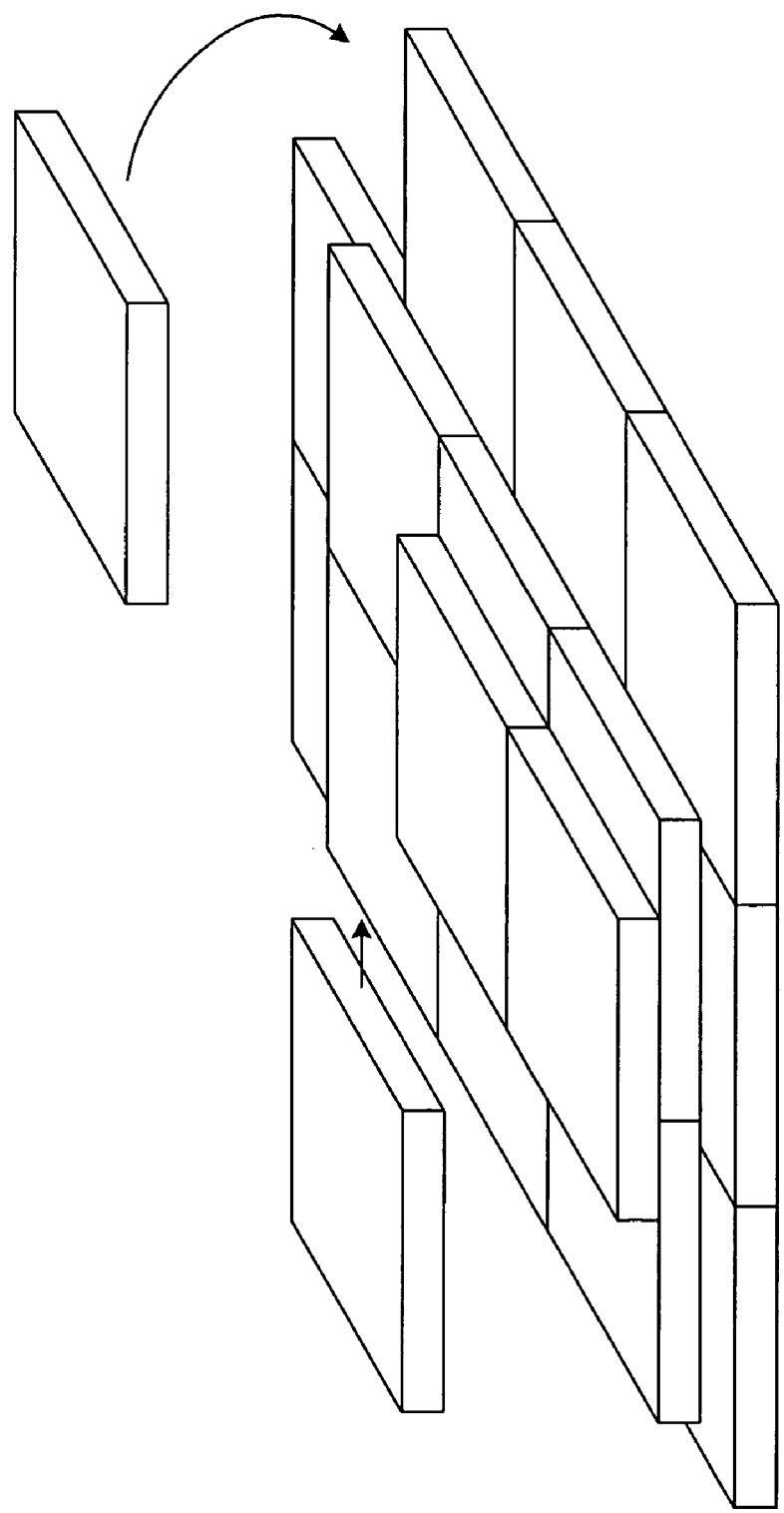

The above-discussed two-dimensional optical state-change organic polymer is one example of a number of organic and/or organometallic materials that theoretically assemble themselves, or are assembled, under appropriate conditions, into layered materials with anisotropic properties. FIGS. 7 and 8 illustrate assembly or self-assembly of a complex, layered, anisotropic material. In FIGS. 7-8, precursors, subunits, or molecular subassemblies of the layers of the multi-layered materials are represented as relatively flat, rectangular volumes, such as flat, rectangular volume 702. In FIG. 7, the precursors, subunits, or subassemblies, such as subunit 702, are shown in random orientation. In different synthetic systems, the subunits may be: (1) small-molecule organic compounds, which self-assemble into stable aggregates held together by non-covalent bonds; (2) small-molecule precursors or subunits that are covalently bound together by polymerization reactions; (3) larger organic or organometallic compounds that self-assemble non-covalently; (4) larger organic or organometallic compounds that are covalently linked together directly; or (5) larger organic or organometallic compounds that are covalently linked together via small, bi-functional linker molecules. By either a self-assembly, synthetic, or combined-self-assembly-and-synthetic process, the subunits, precursors, or molecular subassemblies are intended to assemble together in stable layers, as shown in FIG. 8. In FIG. 8, the layers assemble concurrently. In other systems, two-dimensional films may first assemble, and then be layered one on top of another, or may be synthesized layer-by-layer in a controlled fashion. Not only may the orientations of molecules and separations between layers be important, but also the thickness of the layers, and the total thickness of the multi-layered material.

Regardless of the specific approach used, it is desirable for a well-defined, well-organized multi-layer material to be obtained. The term "well-organized" is meant to indicate that molecular components, or molecular assemblies and complexes, of the material are regularly spaced in at least one dimension. In crystals, molecular components are generally regularly spaced and organized in three dimensions, with molecular components found at identical orientations in space at regular intervals in at least three different directions, the directions considered depending on the geometry of the unit cell. However, well-organized materials can also exhibit regular spacing in less than two dimensions. For example, a material may consist of layers, each layer exhibiting regular, intra-layer molecular spacing in two dimensions, but the layers having relatively random translational orientation to one another. The layers all have identical or nearly identical thicknesses, and there is a regular inter-layer spacing in a direction orthogonal to the plane of the layers, but individual molecular components may not be regularly spaced in that dimension. As another example, a liquid crystal solution under an applied electrical field may exhibit organization in a single dimension, with molecules regularly lined up end-to-end in the direction of the applied field in column-like structures, but without regularity of molecular spacing in directions orthogonal to the direction of the applied field, although, in general, inter-columnar distances are regular.

Figure 9:
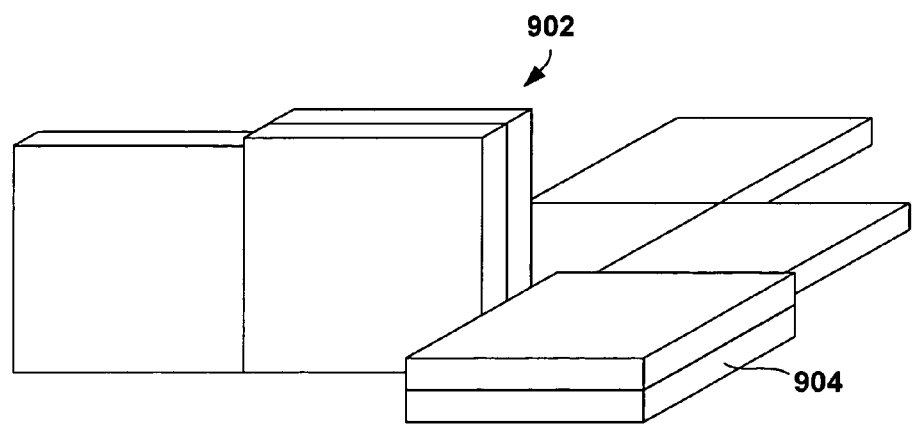
FIG. 9 shows a partially-ordered material.

Unfortunately, instead of the well-structured materials, such as the material illustrated in FIG. 8, disordered or partially ordered structures are instead frequently produced from precursors, subunits, and/or molecular complexes that are attempted to be coaxed together to self-aggregate, polymerize, or otherwise be assembled into a regular structure. FIG. 9 shows a partially-ordered material. In FIG. 9, there are local, well-ordered regions, such as a three-subunit region 902 vertically oriented with respect to a two-subunit region 904. However, there is no long-range order in these disordered materials. Such locally ordered, but globally disordered, states may occur because of problems during manufacture, or may occur following manufacture as a result of exposure of the material to electrical, magnetic or optical signals, or through other degradative processes, such as oxidation or environmental changes that perturb or disrupt the molecular forces responsible for the desired, well-organized structure. With respect to the above-described, two-dimensional optical state-change organic polymer, if the plate-like sheets are not perpendicular to a common access, then the rotors within the sheets have different orientations with respect to the macroscopic surfaces of the material. When a directional electrical field is applied, those rotors that happen to be aligned with the electrical field may be induced to change state, while rotors not sufficiently well aligned with the electrical field may not change state. At the least, the overall cumulative effect of the electrical field will be far less than for well-layered organic polymer. More importantly, the organic-polymer film may not be easily induced, by application of electrical fields or other fields, into a particular state, such as the transparent state that represents one binary value in the above-described, 2-dimensional optoelectronic state-change polymeric material. Many of the desirable properties for layered and networked molecular assemblies used in information storage, processing, and display applications depend on a relatively uniform, anisotropic organization of the molecular subunits within the material. Furthermore, in many applications of multi-layered materials, the spacing between layers and the total thickness of the material may also be critically determinative of usefulness, and these characteristics may also be extremely difficult to precisely manufacture and maintain over the lifetime of the material. Whether responding to magnetic, electrical, optical, or other types of signals or physical phenomena, the materials, when disordered, generally have low or no information-storage, processing, or display utility. For this reason, manufacturers and vendors of information-storage, processing, and display devices have recognized both a need for better methods of manufacture, and a need for more stable materials.

Figure 10:
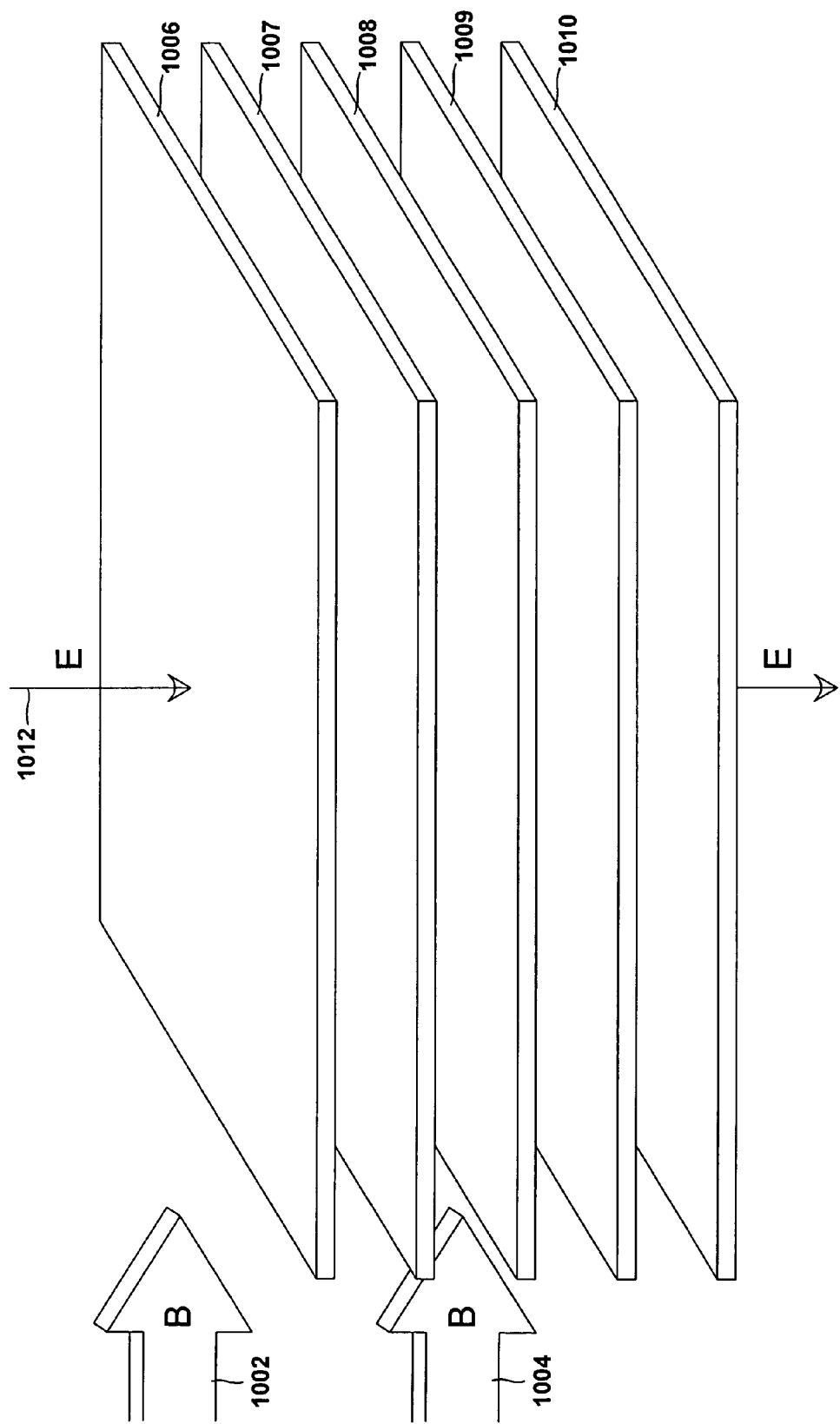
FIG. 10 illustrates a general approach, representing one embodiment of the present invention, for manufacture and/or use of anisotropic materials.

FIG. 10 illustrates a general approach, representing one embodiment of the present invention, for manufacture and/or use of anisotropic materials. A magnetic field, indicated by arrows 1002 and 1004, is used to orient the layers of a multi-layered material 1006-1010, while an electrical field, indicated by arrow 1012, is used to select one of two or more states within regions of the material in order to store or display information. Although the two different fields are shown as orthogonal, different field orientations may be used in different examples, depending on the choice of properties to be accessed in the multi-layered material. Application of forces may be concurrent or separated in time, and may be used at a single stage or at multiple stages during manufacturing and subsequent information storage, retrieval, processing, and display. As one example, the multi-layered material may be manufactured under the influence of a magnetic field in order to produce a material with uniformly oriented and separated layers, which therefore has precisely defined, anisotropic properties. The states of the material may then be subsequently changed via an electrical field and accessed by an optical technique, as in the case of the two-dimensional optical state-change organic polymer discussed above. In some cases, once the polymers are oriented during manufacture into a layered structure, the magnetic field can be removed and the structure maintained, either by the molecular forces resident within the structure or by application of a curing, linking, or additional polymerization step that fixes the respective positions of the layers within the material. In other applications, the magnetic field may be permanently employed in order to maintain orientation of the molecular components within the material. In some cases, the magnetic field may be employed both during manufacture and, subsequently, for storing and retrieving information. In other cases, information may be stored, retrieved, processed, or displayed by application of other types of fields and/or forces, including electrical fields and optical signals.

Figure 11:
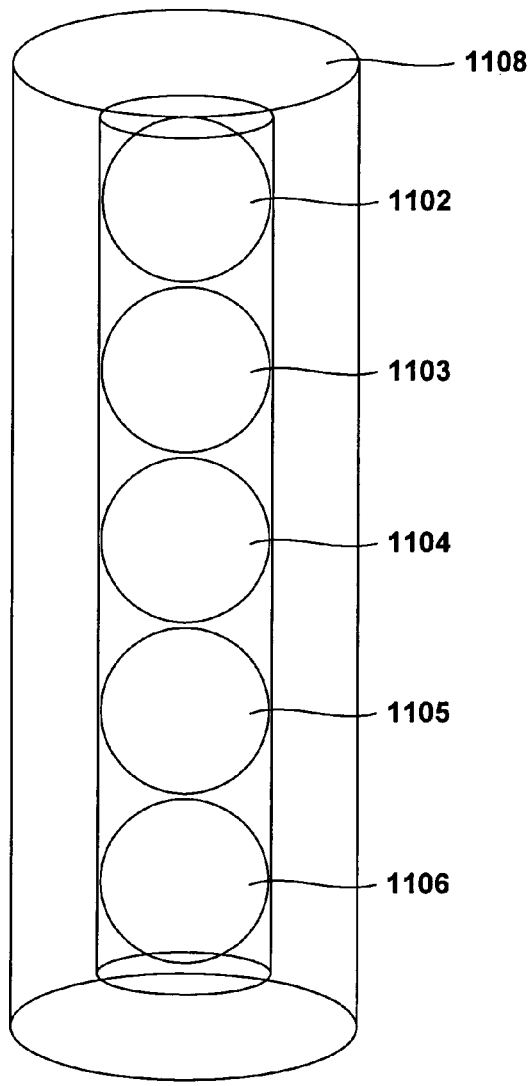
FIGS. 11-14 illustrate preparation of a complex, anisotropic material according to one embodiment of the present invention.

As an example embodiment of the present invention, an improved optical state-change material, and a method for manufacturing the improved optical state-change material, is next provided. FIGS. 11-14 illustrate preparation of a complex, anisotropic material according to one embodiment of the present invention. First, a ferromagnetic-molecular-frame component is prepared. FIG. 11 shows a schematic illustration of an example of a ferromagnetic-molecular-frame component according to one embodiment of the present invention. The example ferromagnetic-molecular-frame component includes ferromagnetic particles 1102-1106 encased, or sheathed, within an organic layer 1108. The ferromagnetic particles may be nanoscale particles composed of ferromagnetic metal or metal oxide compounds, or other molecules that can be induced to move in an applied magnetic field. The particles may be, in certain embodiments, encased in an organic layer 1108 in order to provide stability, to provide a substrate for binding linkers or directly binding two-dimensional plate-like organic compounds, and to also serve as an insulator to prevent electrical conductance by the ferromagnetic-molecular-frame component. In other embodiments, the ferromagnetic particles may be simply nanometer to micrometer sized ferromagnetic particles that, in the presence of a magnetic field, assemble into columns oriented in a particular direction with respect to the applied magnetic field.

Figure 12:
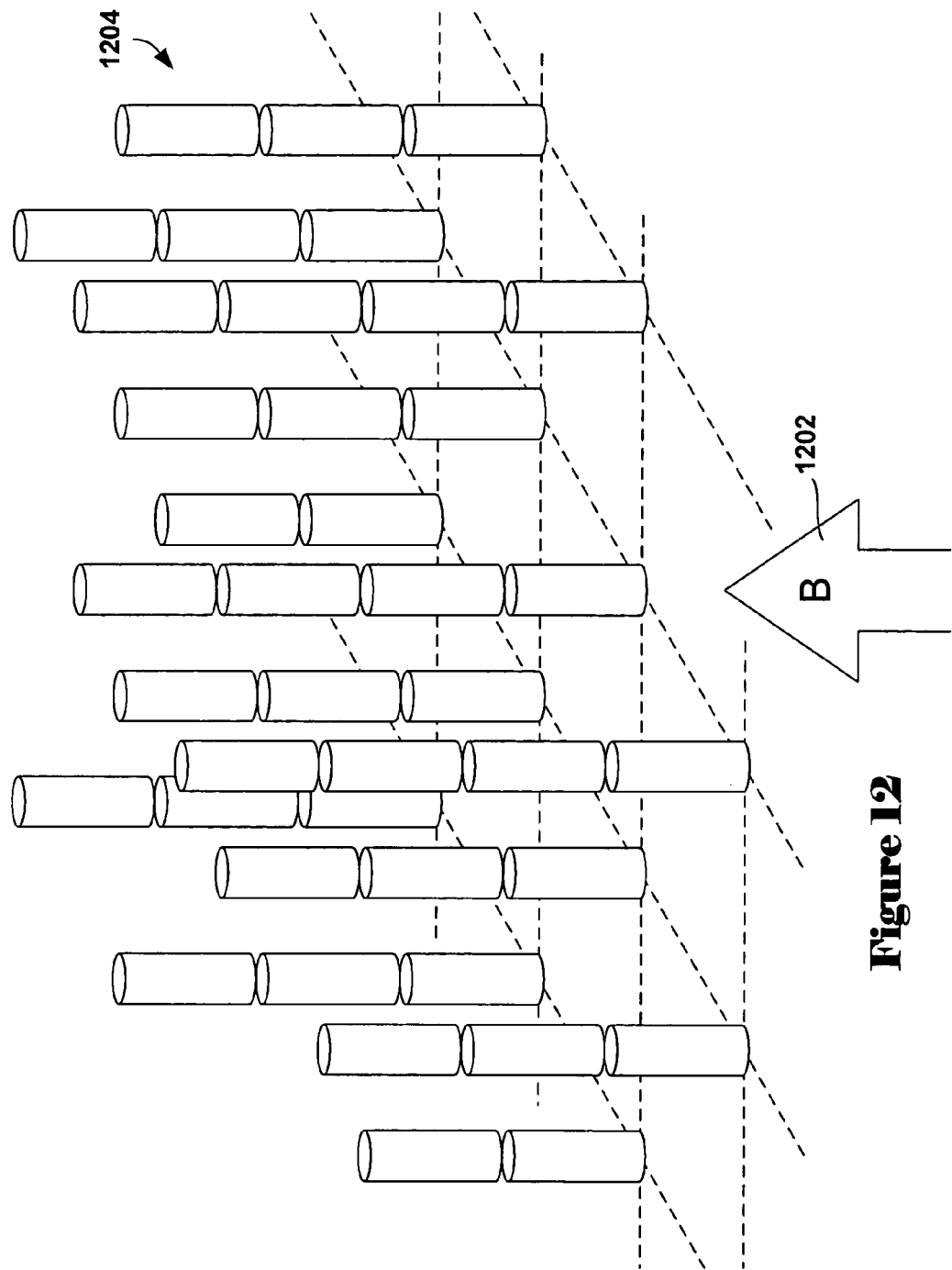

Next, as shown in FIG. 12, the ferromagnetic-molecular-frame components are oriented, according to one embodiment of the present invention, by application of a magnetic field, into columns rising from the surface of a substrate. In FIG. 12, the applied magnetic field 1202 is shown to orient the ferromagnetic-molecular-frame components parallel to the applied magnetic field into well-separated columns, such as column 1204. Separation may be facilitated by the organic encapsulating layer of the ferromagnetic-molecular-frame components. For example, the encapsulating layer may be negatively or positively charged, so that separation occurs through repulsive electrostatic forces. Separation may also be induced by steric hindrance, localized solvent structures, or other phenomena.

Figure 13:
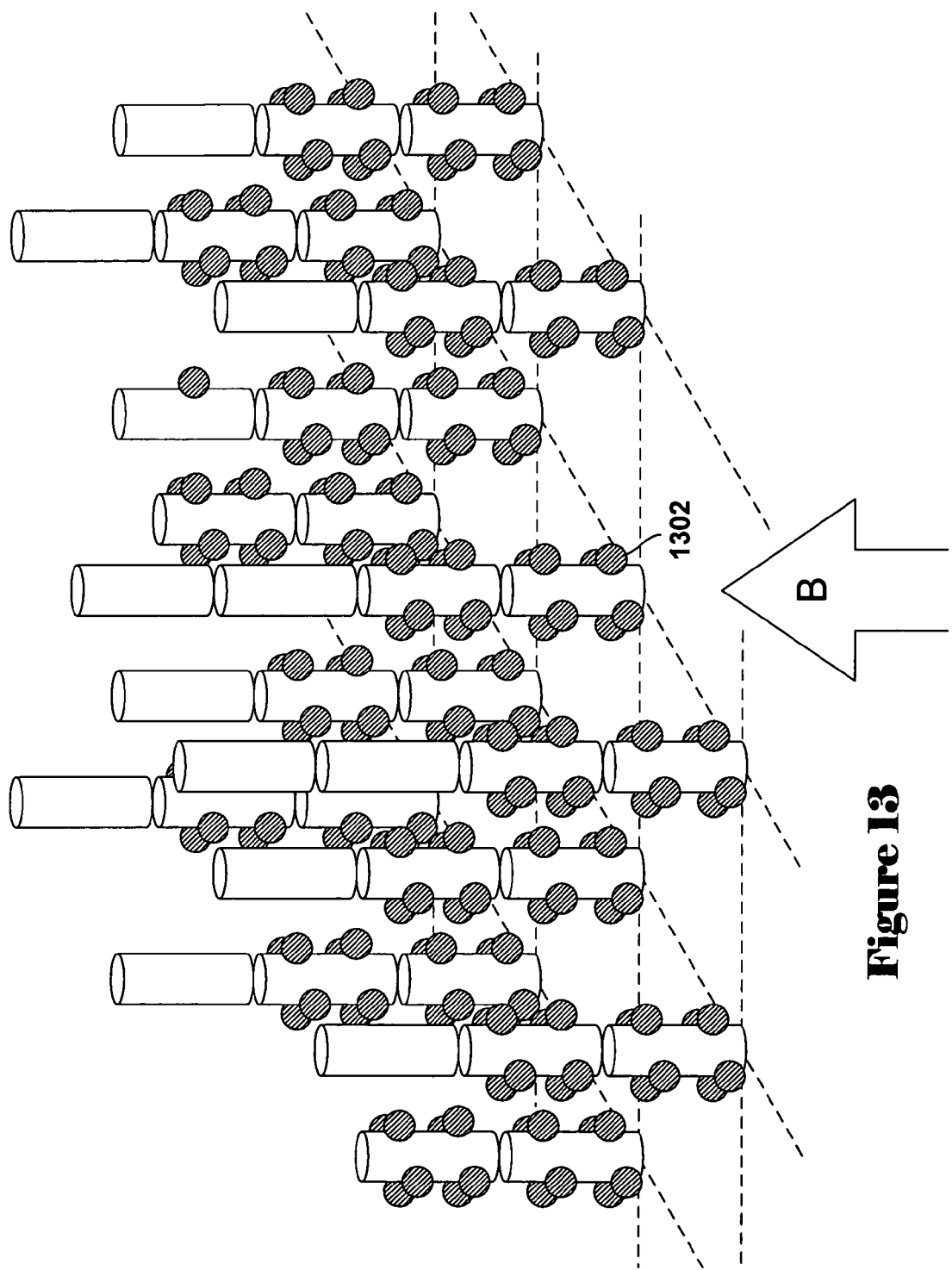
Figure 14:
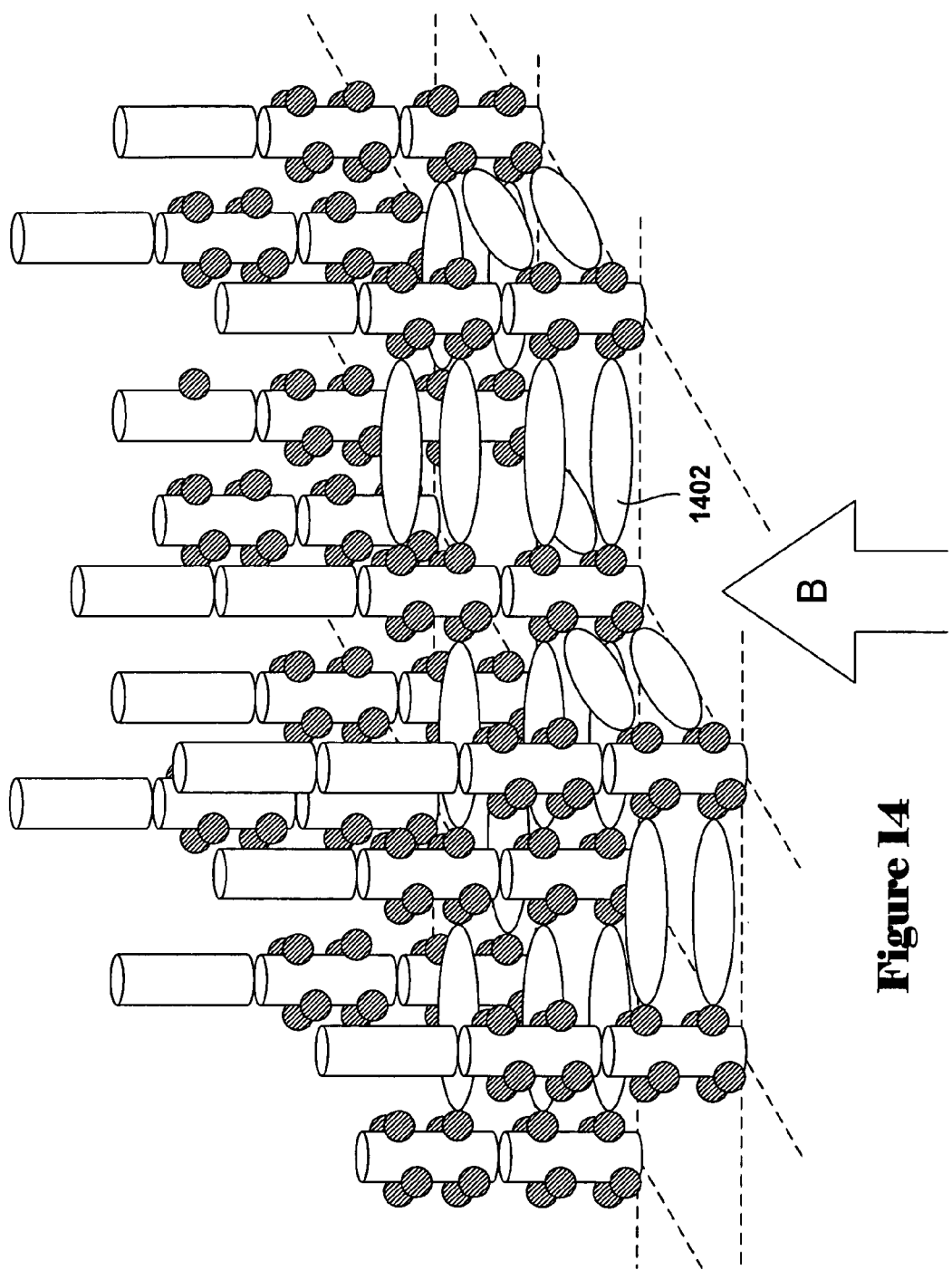
Figure 15:
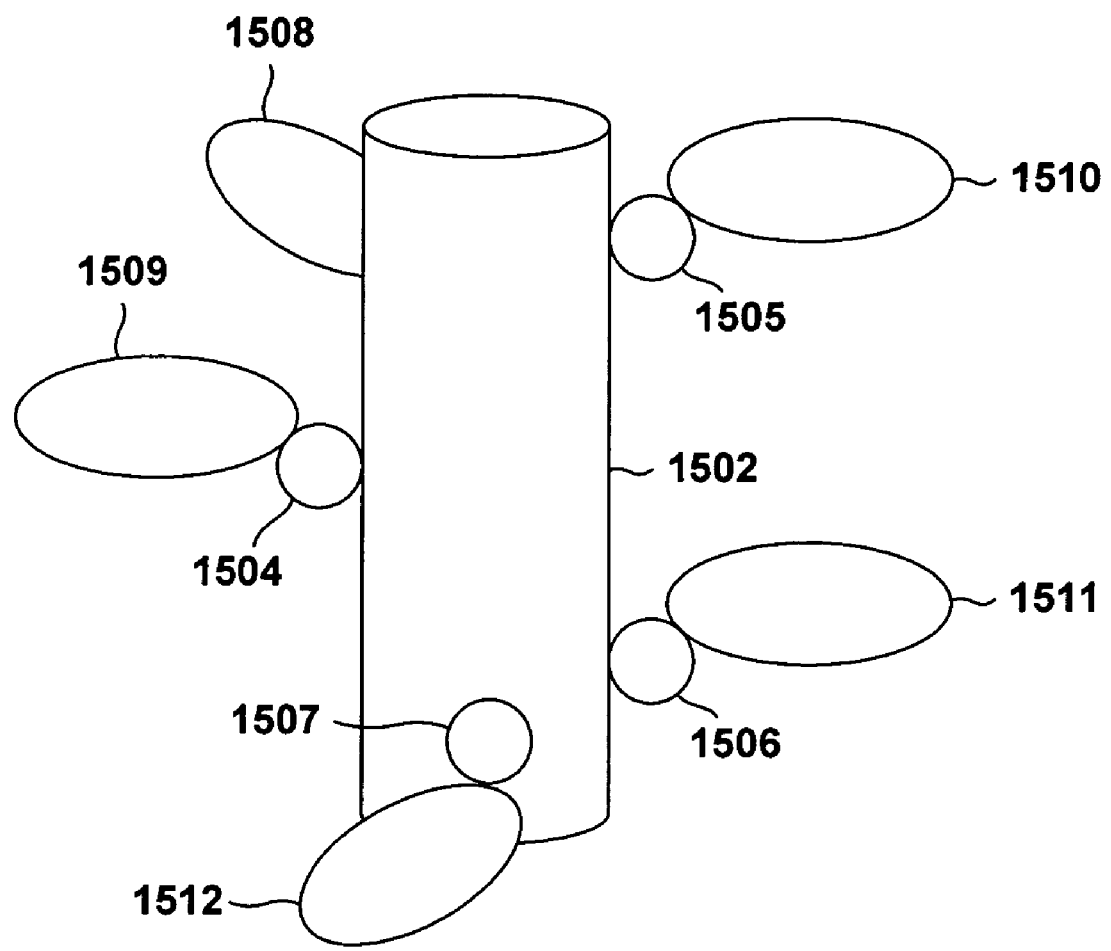
FIG. 15 illustrates a single ferromagnetic-molecular-frame component and attached plate-like organic polymers in a final network-like, anisotropic material produced by the process illustrated in FIGS. 11-14 that represents one embodiment of the present invention.

Next, as shown in FIG. 13, while still under the applied magnetic force, linker groups, represented in FIG. 13 by darkly colored spheres, such as sphere 1302, are covalently linked to the organic sheath of the ferromagnetic-molecular-frame components according to one embodiment of the present invention. This step may occur prior to organization of the ferromagnetic-molecular-frame components into columns by the magnetic field, in alternative embodiments. Then, as illustrated in FIG. 14, plate-like organic polymer components are introduced into the solution, still under the applied magnetic field, to self-organize into stacked layers, with each plate-like organic molecule linking to two or more linker molecules along the ferromagnetic-molecular-frame component columns according to one embodiment of the present invention. In FIG. 14, the plate-like organic molecules are represented by elliptical disks, such as elliptical disk 1402. Note that the ferromagnetic-molecular-frame component columns serve to space and separate the plate-like organic polymers in order to form a well-organized network of plate-like organic polymers. In a final step, solvent may be removed and a curing treatment applied in order to covalently fix the organic polymer within the network of organic polymer and ferromagnetic-molecular-frame component columns. In alternative embodiments, the plate-like organic polymer compounds, also referred to as "device molecules," may be synthesized within the network, rather than being introduced into the network. FIG. 15 illustrates a single ferromagnetic-molecular-frame component and attached plate-like organic polymers in a final network-like, anisotropic material produced by the process illustrated in FIGS. 11-14 that represents one embodiment of the present invention. The ferromagnetic frame component 1502 is seen to be studded with linker molecules 1504-1507, to which the organic polymer molecules are affixed 1508.

The linkers in the above described method may be an elongated, aliphatic, aromatic, or a combination of both aliphatic and aromatic organic molecules with functional groups on each end. The functional groups at each end can be the same or different. Different functional groups are preferred in order to differentiate linking magnetic particles from linking device molecules. In certain embodiments, one of the two functional groups should be capable of attaching to the surface of magnetic particles via one or more forces and potentials, including: covalent bonding, ionic bonding, Van der Waals forces and/or coordination bonding. Many different functional groups can be used, including: —COOH and its derivatives (i.e. alkali salt, amide, ester, acid halide, acid anhydride, and other derivatives); —$SO_3H$ and its derivatives (i.e. alkali salt, amide, ester, acid halide, acid anhydride, and other derivatives); —$H_2PO_3$ and its derivatives (i.e. alkali salt, amide, ester, acid halide, acid anhydride, and other derivatives); —$H_2BO_2$, and its derivatives (i.e. alkali salt, ester, acid anhydride, and other derivatives); —OH and its derivatives (i.e. ether, ester, and other derivatives); —$NH_2$; —N(alkyl)H; —N(aryl)H; —SH and its derivatives (i.e. thio-ether, thio-ester, disulfide, and other derivatives); —CC—, —CH=CH$_2$ and derivatives (i.e. alkyl or aryl derivatives); -halide (i.e. —Cl, —Br, —I); and —NHNH$_2$ and its derivatives (i.e. alkyl or aryl derivatives). In certain embodiments, another functional group of the linker should be capable of linking desired device molecules on the ferromagnetic frames via one or more forces and potentials, including: covalent bonding, ionic bonding, Van der Waals forces and/or coordination bonding. Many different functional groups can be used, including: —CC—SiR$_3$ (R=an alkyl or aryl group or a combination of an alkyl and aryl group), such as trimethylsilyl ("TMS"); —COOH and derivatives (i.e. alkali salt, amide, ester, acid halide, acid anhydride, and other derivatives); —SO$_3$H and derivatives (i.e. alkali salt, amide, ester, acid halide, acid anhydride, and other derivatives); —H$_2$PO$_3$ and derivatives (i.e. alkali salt, amide, ester, acid halide, acid anhydride, and other derivatives); —SH; -amine; —OH; ketone; aldehyde; and halide (i.e. —Cl, —Br, —I).

In certain embodiments, the device molecules include rotor-stator type switchable dyes, such as the above-described two-dimensional optical state-change organic polymer. The device molecules are engineered to have end groups compatible for linkage with linker functional groups, via one or more forces and potentials, including: covalent bonding, ionic bonding, Van der Waals forces and/or coordination bonding. Linkage between linker and the device molecules can be accomplished either through a physical interaction or through chemical reaction. Covalent linkages are the result of chemical reactions. Many different chemical reactions for covalent linkage can be used, including one of the following: an oxidative cross-coupling reaction (i.e. formation of —CC—CC—, —S—S—, and other covalent bonds); a substitution reaction (i.e. formation of —S—CRR'—, —O—CRR'—, —NH—CRR'—, and other covalent bonds (R, R'=H, an alkyl or aryl group, or a combination of an alkyl and aryl group)); a dehydration reaction (i.e. formation of —CRR'—O—CR"R'", —CH=N—, —CR=N—, —COOCRR'—, and other covalent bonds); an addition reaction (i.e. formation of —S—CRR'—CHR"—COR'", and other covalent bonds (R', R", R'"=H, an alkyl or aryl group, or a combination of an alkyl and aryl group)). Many end groups for device molecules can be used, including: —CC—H, —CC—SiR$_3$ (R=alkyl or aryl group or a combination of alkyl and aryl group); —COOH and derivatives (i.e. its alkali salt, amide, ester, acid halide, acid anhydride, and other derivatives); —SO$_3$H and derivatives (i.e. alkali salt, amide, ester, acid halide, acid anhydride, and other derivatives); —H$_2$PO$_3$ and derivatives (i.e. alkali salt, amide, ester, acid halide, acid anhydride, and other derivatives); —SH; -amine; —OH; ketone; aldehyde; halide (i.e. —Cl, —Br, —I); and other end groups.

Figure 16:
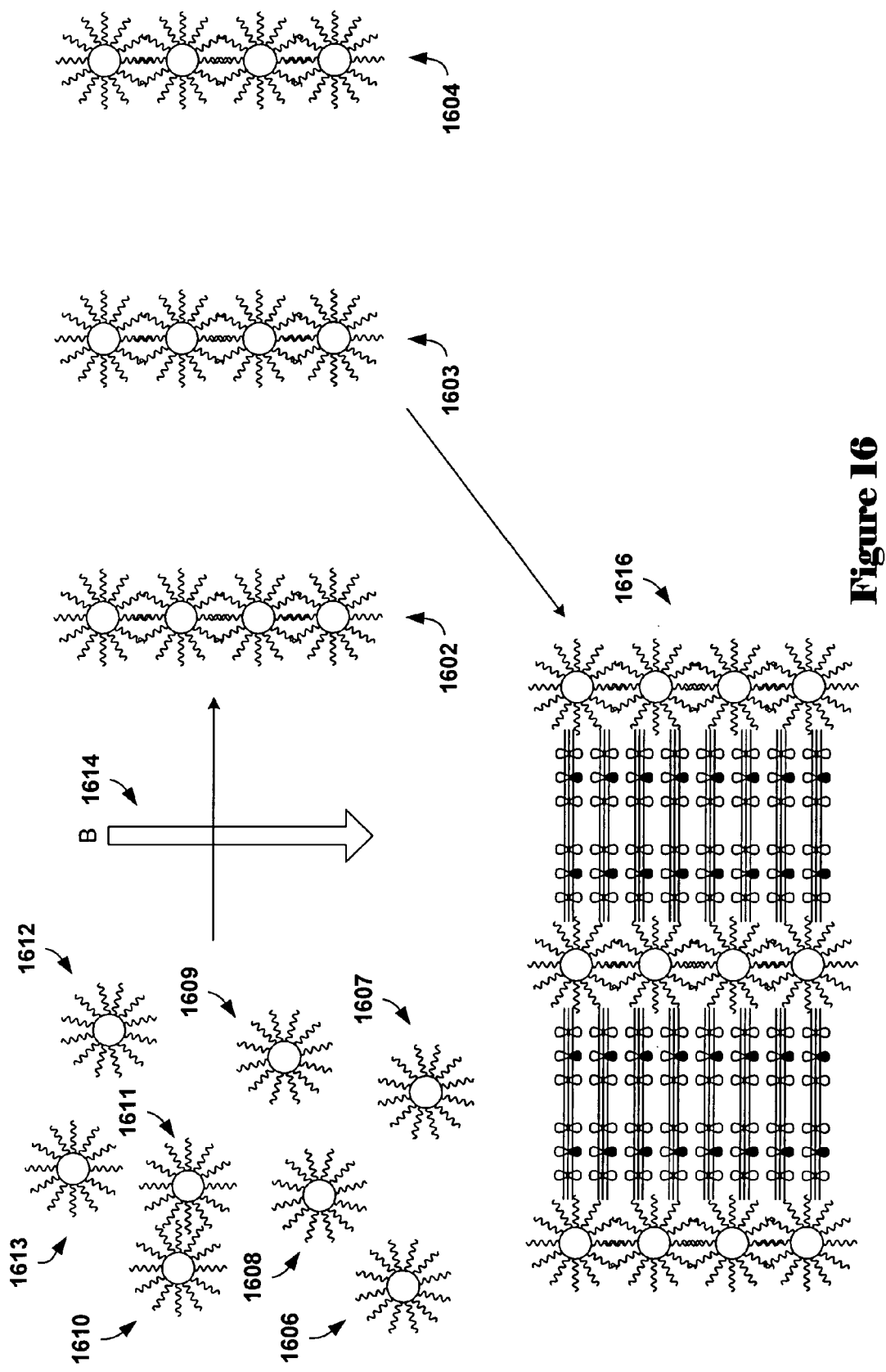
FIG. 16 shows construction of a complex, multi-layered anisotropic material with ferromagnetic frames and 2-dimensional, stator/rotor, plate-like, organic polymers according to one embodiment of the present invention.

Specific examples of producing complex, anisotropic materials using di-acetyelene as the linkage via an oxidative cross coupling reaction are next provided. FIG. 16 shows construction of a complex, multi-layered anisotropic material with ferromagnetic frames and 2-dimensional, stator/rotor, plate-like, organic polymers according to one embodiment of the present invention. In FIG. 16, magnetic frames (1602-1604) are formed from pretreated magnetic particles (1606-1613) under an applied magnetic field 1614, onto which a molecular thin film 1616 self assembles.

Figure 17:
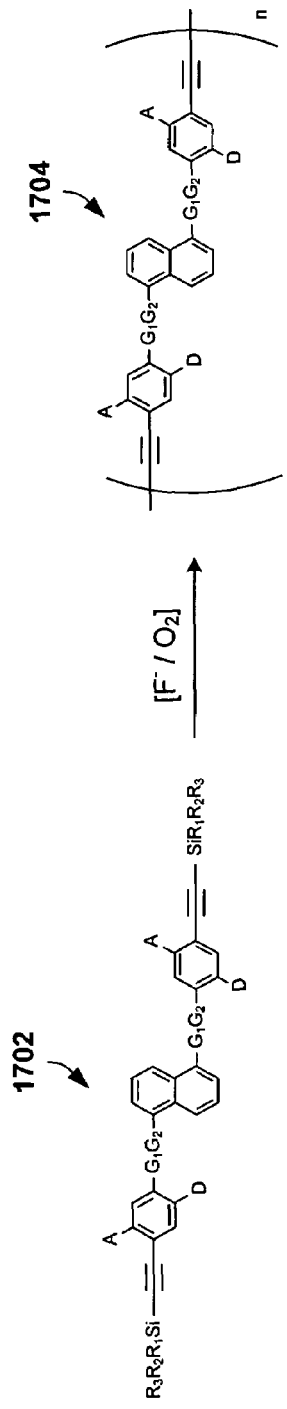
FIG. 17 illustrates linking of monomers, each containing two rotors and one stator, by acetylene units into an extended one-dimensional polymer, according to one embodiment of the present invention.

FIG. 17 illustrates linking of monomers, each containing two rotors and one stator, by acetylene units into an extended one-dimensional polymer, according to one embodiment of the present invention. The monomer 1702 comprises a naphthalene dicyclic-ring stator and two substituted ethynylbenzene rotors. In FIG. 17, the letter "A" indicates an acceptor group, in the example of FIG. 17, an electron-withdrawing group. Many different electron-withdrawing groups may be used, including: carboxylic acid or derivatives, sulfuric acid or derivatives, phosphoric acid or derivatives, aldehyde or derivatives, ketone or derivatives, imine or derivatives, hydrazone or derivatives, >C=C(COR)$_2$, >C=C(COOR)$_2$, >C=C(COR)COOR', >C=C(CN)$_2$, >C=C(CN)COR, >C=C(CN)COOR, where R and R' represent an alkyl or aryl group, azo, nitro, nitrile, hetero atoms (e.g., N, O, S, P, F, Cl, and Br), functional groups with at least one of above-mentioned atoms (e.g., OH, SH, NH, etc.), hydrocarbons (either saturated or unsaturated), and substituted hydrocarbons. In FIG. 17, the letter "D" represents a donor group, an electron-donating group. Many different electron-withdrawing groups may be used, including: hydrogen, amine, OH, SH, ether, hydrocarbon (either saturated or unsaturated), substituted hydrocarbon, and functional groups with at least one hetero atom (e.g., B, Si, I, N, O, S, P). The donor group is less electronegative than the acceptor group, or, equivalently, more electropositive than the acceptor group. In FIG. 17, $G_1$-$G_2$ represent a conjugated connecting unit linking the rotor and stator portion together. Linkers useful in this embodiment include: acetylene or substituted acetylene, ethene or substituted ethene, >C=N—, —N=N—, and others.

Figure 18:
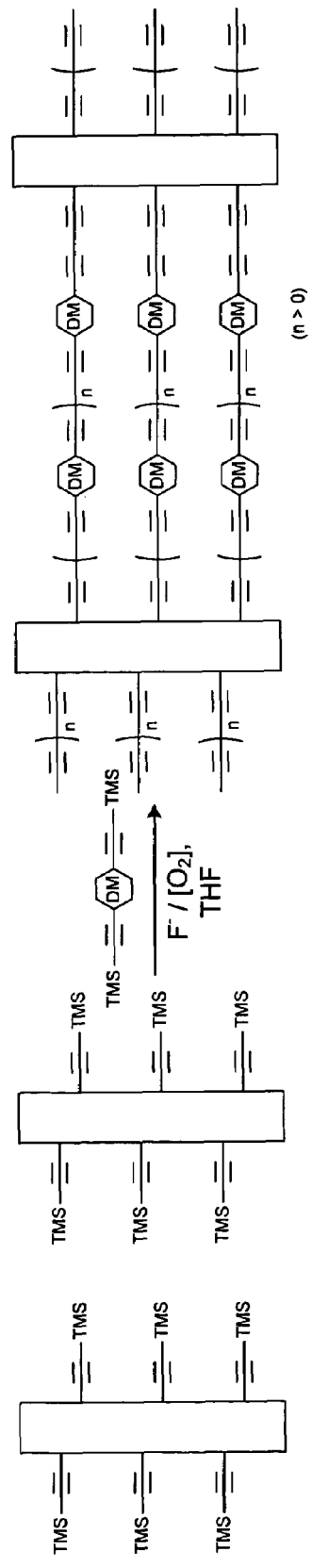
FIG. 18 illustrates self-assembly of a molecular thin film onto a ferromagnetic frame according to one embodiment of the present invention.

FIG. 18 illustrates self-assembly of a molecular thin film onto the ferromagnetic frame, using di-acetyelene as the linkage between the stator/rotor organic polymer and the ferromagnetic molecular frame components, via an oxidative cross coupling reaction, according to one embodiment of the present invention. In the reaction shown in FIG. 18, the trisubstituted silyl groups SiR$_1$R$_2$R$_3$ appear to be first removed by nucleophilic substitution by F$^-$ and resulting acetylenyl ions condensed via an oxidation step. In FIG. 18, and in subsequent figures, R$_1$, R$_2$, and R$_3$ may be the same or different alkyl groups.

The two-rotor-one-stator monomer 1702 is a very useful building block for construction of highly conjugated one-dimensional systems 1704. The substrate is prepared from 1,5-dihydroxy naphthalene, di-bromo-nitrobenzene and TMS-acetylene over several steps via a standard cross-coupling reaction (D=H and A=—NO$_2$ in this reaction). Deprotection of TMS-groups, in the presence of oxygen, leads to a highly conjugated 1-D polymeric network. The one-dimensional polymeric material is colored with a very high optical density when all rotors and stators in the network are in a coplanar conformation. The material becomes colorless when all its rotors are in a non-planar conformation with the plane of the stator network. The rotors within the network can be switched on and off by an applied external electrical-field. This one-dimensional polymer can be used for a paper-like display or other commercial application.

Figure 19:
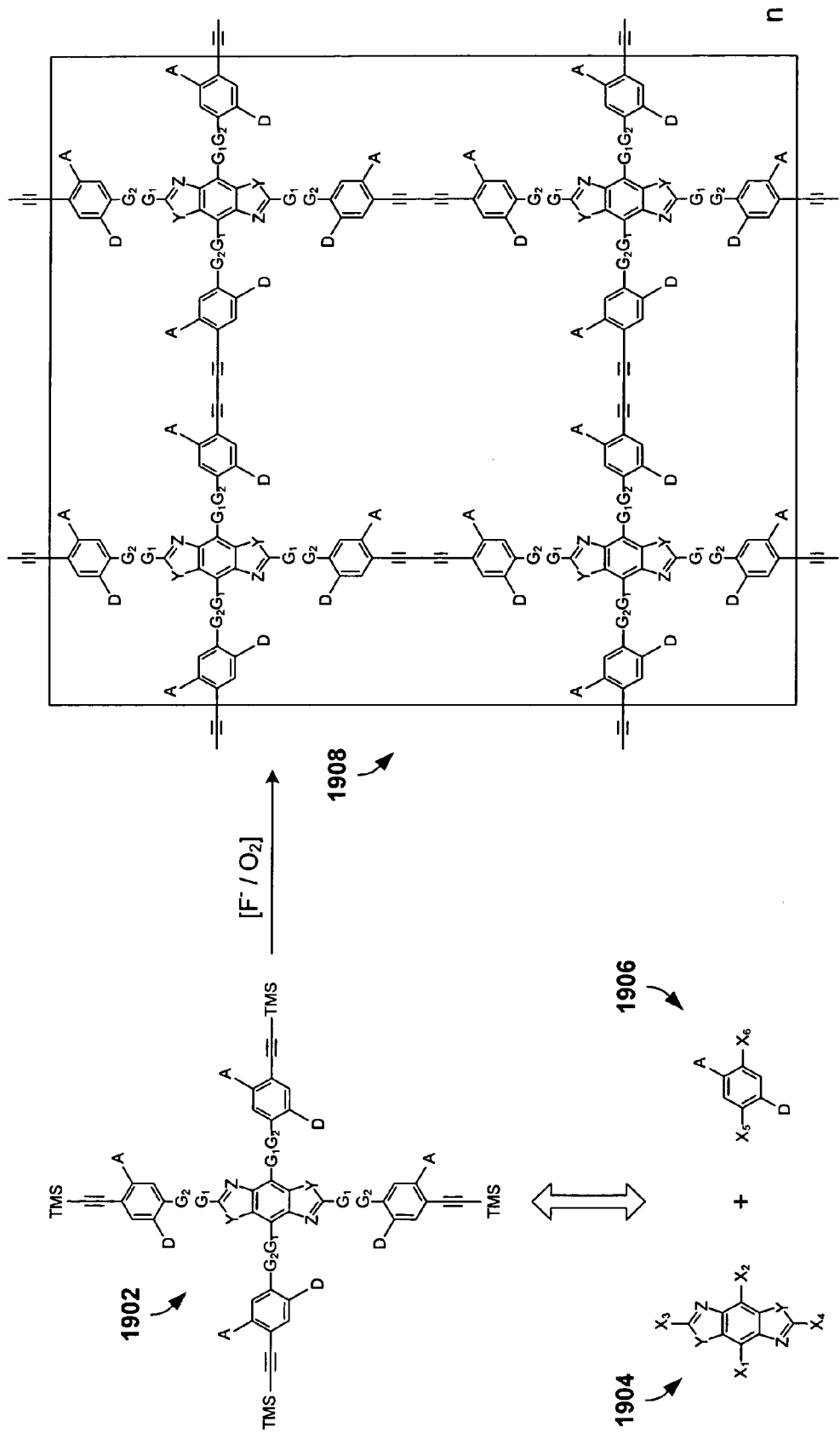
FIG. 19 illustrates construction of a two-dimensional rotor/stator network according to one embodiment of the present invention.

FIG. 19 illustrates construction of a two-dimensional rotor/stator network according to one embodiment of the present invention. The starting substrate 1902 is constructed in such a way that four rotors and one stator are linked directly by acetylene units. In FIG. 19, the letter "A" is an electron-withdrawing, acceptor group. Useful acceptor groups include: carboxylic acid and derivatives, sulfuric acid and derivatives, phosphoric acid and derivatives, aldehyde or derivatives, ketone or derivatives, imine or derivatives, hydrazone or derivatives, >C=C(COR)$_2$, >C=C(COOR)$_2$, >C=C(COR)COOR', >C=C(CN)$_2$, >C=C(CN)COR, >C=C(CN)COOR, where R and R' represent an alkyl or aryl group, azo, nitro groups, nitrile groups, hetero atoms (e.g., N, O, S, P, F, Cl, Br), functional groups with at least one of the above-mentioned hetero atoms (e.g., OH, SH, NH, and others), hydrocarbons (either saturated or unsaturated), and substituted hydrocarbons. The letter "D" represents an electron-donating donor group. Useful donor groups include: hydrogen, amine, OH, SH, ether, hydrocarbon (either saturated or unsaturated), or substituted hydrocarbon or functional group with at least one hetero atom (e.g., B, Si, I, N, O, S, P). In FIG. 19, the letters "Y" and "Z" represent atoms or atomic subunits that form a five-member ring system. Both of these letters can represent the same or different atom or subunit, including: N, S, O, P, NH, N-alkyl, hydrocarbon (e.g. —$CH_2$—), and substituted hydrocarbon. The symbols "$X_1$," "$X_2$," "$X_3$," "$X_4$," "$X_5$," and "$X_6$" represent leaving groups in the aromatic ring during nucleophilic substitution or metal catalyzed cross-coupling reaction. These leaving groups can be either an atom or an atomic subunit. They can be the same unit or different unit. Suitable leaving groups include: Cl, Br, I, F, O—$SO_3CF_3$, O—$SO_3$-Aryl. The aryl group can be a phenyl group or substituted hydrocarbon. The symbols "$G_1$-$G_2$" represent a conjugated connecting unit to link the rotor and stator portion together. Suitable connecting units $G_1$-$G_2$ include: acetylene or substituted acetylene, ethene or substituted ethene, >C=N—, and —N=N—, and others.

The monomer 1902 is a very useful building block for construction of a highly conjugated two-dimensional system. It is prepared from substrates 1904 and 1906 over several steps via a standard cross-coupling reaction process. Both starting materials 1904 and 1906 are very useful building blocks for molecular electronics research. De-protection of TMS-groups of 1902 in the presence of oxygen leads to a highly conjugated two-dimensional polymeric network 1908. This two-dimensional polymeric material becomes colored when rotors and stators are in the coplanar conformation. The color density is proportional to the number of rotors and stators in the network that are in a coplanar conformation. The material becomes colorless when all its rotors are in a non-planar conformation with the plane of the stator network. The rotors as well as the color of the material is switched on or off by an applied external electrical-field. It is bistable, and can be used for a paper-like display or other commercial application.

Figure 20:
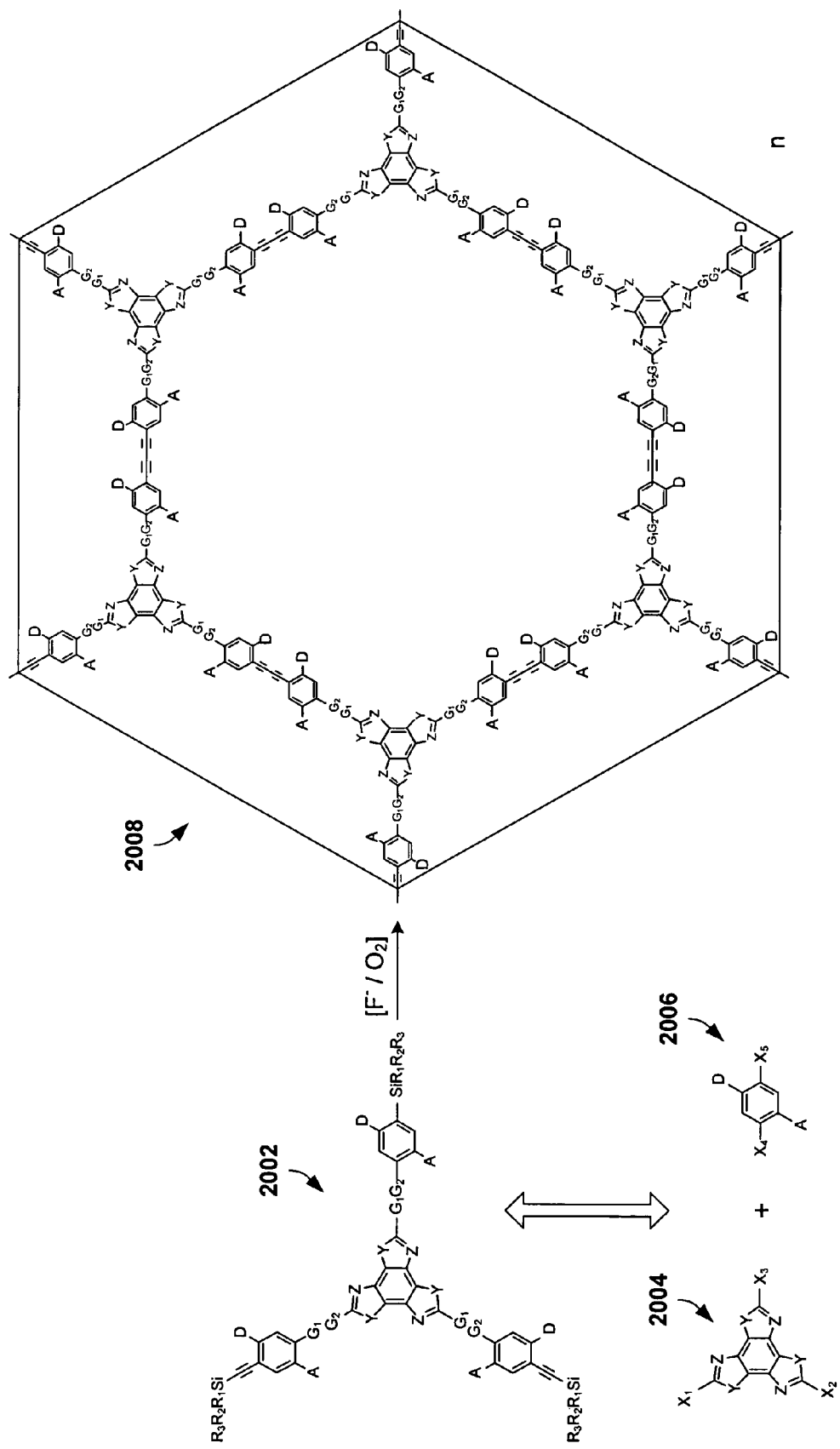
FIG. 20 illustrates an alternative method for construction of a two-dimensional rotor/stator network according to one embodiment of the present invention.

FIG. 20 illustrates an alternative method for construction of a two-dimensional rotor/stator network according to one embodiment of the present invention. In FIG. 20, the building block 2002 is constructed using acetylene units to link together three rotors and one stator. In FIG. 20, the letter "A" is an electron-withdrawing, acceptor group. Useful acceptor groups include: carboxylic acid and derivatives, sulfuric acid and derivatives, phosphoric acid and derivatives, aldehyde or derivatives, ketone or derivatives, imine or derivatives, hydrazones or derivatives, >C=C$(COR)_2$, >C=C$(COOR)_2$, >C=C(COR)COOR', >C=C$(CN)_2$, >C=C(CN)COR, >C=C(CN)COOR, where R and R' represent an alkyl or aryl group, azo, nitro groups, nitrile groups, hetero atoms (e.g., N, O, S, P, F, Cl, Br), functional groups with at least one of above-mentioned hetero atoms (e.g., OH, SH, NH, and others), hydrocarbons (either saturated or unsaturated), and substituted hydrocarbons. The letter "D" represents an electron-donating donor group. Useful donor groups include: hydrogen, amine, OH, SH, ether, hydrocarbon (either saturated or unsaturated), or substituted hydrocarbon or functional group with at least one hetero atom (e.g., B, Si, I, N, O, S, P). In FIG. 19, the letters "Y" and "Z" represent atoms or atomic subunits that form a five-member ring system. Both of the letters can represent the same or different atom or subunit, including: N, S, O, P, NH, N-alkyl, hydrocarbon (e.g. —$CH_2$—), and substituted hydrocarbon. The symbols "$X_1$," "$X_2$," "$X_3$," "$X_4$," "$X_5$," and "$X_6$" metal catalyzed cross-coupling reaction. These leaving groups can be either an atom or an atomic subunit. They can be the same unit or different unit. Suitable leaving groups include: Cl, Br, I, F, O—$SO_3CF_3$, O—$SO_3$-Aryl. The aryl group can be a phenyl group or substituted hydrocarbon. The symbols "$G_1$-$G_2$" represent a conjugated connecting unit to link the rotor and stator portion together. Suitable connecting units $G_{1-G2}$ include: acetylene or substituted acetylene, ethene or substituted ethene, >C=N—, and —N=N—, and others.

The monomer 2002 is a very useful building block for construction of highly conjugated two-dimensional systems. This substrate is prepared from starting materials 2004 and 2006 over several steps by a similar cross-coupling reaction to those mentioned earlier. De-protection of TMS-groups, in the presence of oxygen, leads a highly conjugated two-dimensional polymeric network 2008. This two-dimensional polymeric material is highly colored when all rotors and stators in the network are in a coplanar conformation. The material becomes colorless when all its rotors are in a non-planar conformation with the plane of the stator network. The rotors as well as the color of the material is switched on or off by an applied external electrical-field. It is bistable, and can be used for a paper-like display or other commercial application.

Although the present invention has been described in terms of a particular embodiment, it is not intended that the invention be limited to this embodiment. Modifications within the spirit of the invention will be apparent to those skilled in the art. For example, any of a nearly limitless number of different device molecules may be organized within a ferromagnetic frame, according to a nearly limitless number of different embodiments of the present invention. The framework, in the disclosed embodiments, has the form of numerous columns of ferromagnetic particles or encapsulated ferromagnetic particles aligned with an externally applied magnetic field, but an almost limitless number of different types of ferromagnetic frameworks can be constructed from various different ferromagnetic molecular frame components, under different magnetic field strengths and orientations. In alternative embodiments, an applied electrical field, or other applied field, force, or directed electromagnetic radiation is employed to orient precursors, subunits, and/or molecular subassemblies during manufacture. For example, electrical fields are known to orient asymmetrical liquid-crystal molecules in solution, and electrical fields may be used to similarly order materials during manufacture.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method that produces a well-organized, anisotropic material, the method comprising:

providing a solution of ferromagnetic molecular frame components;

applying a magnetic field to the solution of ferromagnetic molecular frame components to assemble a ferromagnetic frame; and introducing device molecules that self-assemble within the ferromagnetic frame to form a well-organized, anisotropic material.

2. The method of claim 1 further including, following assembly of the ferromagnetic molecular frame, introducing linker molecules that bind to the ferromagnetic molecular frame.

3. The method of claim 2 further including, following assembly of the ferromagnetic molecular frame and introduction of linker molecules that bind to the ferromagnetic molecular frame, introducing the device molecules that self-assemble within the ferromagnetic frame by binding to linker molecules to form the well-organized, anisotropic material.

4. The method of claim 3 further including, following self-assembly of the device molecules into the well-organized, anisotropic material, fixing the self-assembled anisotropic material into a well-organized state by one of:
   introducing an additional chemical compound;
   applying an additional force; and
   applying an additional environmental condition.

5. The method of claim 3 wherein well-organized, anisotropic materials include:
   two-dimensional organic polymers;
   organometallic polymers;
   layered, two-dimensional organic polymers;
   layered, two-dimensional organometallic polymers;
   networked, three-dimensional organic polymers; and
   networked, three-dimensional organometallic polymers.

6. The method of claim 5 wherein the device molecules are naphthalene dicyclic-ring stators with two substituted ethynylbenzene rotors, as shown in FIG. 17, and wherein substituents include:
   acceptor groups, indicated by the letter "A" in FIG. 17, electron-withdrawing groups including one or more of carboxylic acid or derivatives, sulfuric acid or derivatives, phosphoric acid or derivatives, aldehyde or derivatives, ketone or derivatives, imine or derivatives, hydrazone or derivatives, $>C=C(COR)_2$, $>C=C(COOR)_2$, $>C=C(COR)COOR'$, $>C=C(CN)_2$, $>C=C(CN)COR$, $>C=C(CN)COOR$, where R and R' represent an alkyl or aryl group, azo, nitro, nitrile, hetero atoms, such as N, O, S, P, F, Cl, and Br, functional groups with at least one of above-mentioned atoms, such as OH, SH, NH, hydrocarbons, and substituted hydrocarbons;
   donor groups, indicated by the letter "D" In FIG. 17, electron-donating groups including one or more of hydrogen, amine, OH, SH, ether, hydrocarbon, substituted hydrocarbon, and functional groups with at least one hetero atom, such as B, Si, I, N, O, S, P; and
   a conjugated connecting unit linking the rotor and stator portion together, represented in FIG. 17 by the symbols "$G_1$" and "$G_2$."

7. The well-organized, anisotropic material of claim 5 wherein the device molecules are shown in FIG. 19 as aromatic compounds 1904 and 1903, and wherein substituents include:
   acceptor groups, indicated by the letter "A" in FIG. 17, electron-withdrawing groups including one or more of carboxylic acid or derivatives, sulfuric acid or derivatives, phosphoric acid or derivatives, aldehyde or derivatives, ketone or derivatives, imine or derivatives, hydrazone or derivatives, $>C=C(COR)_2$, $>C=C(COOR)_2$, $>C=C(COR)COOR'$, $>C=C(CN)_2$, $>C=C(CN)COR$, $>C=C(CN)COOR$, where R and R' represent an alkyl or aryl group, azo, nitro, nitrile, hetero atoms, such as N, O, S, P, F, Cl, and Br, functional groups with at least one of above-mentioned atoms, such as OH, SH, NH, hydrocarbons, and substituted hydrocarbons;
   donor groups, indicated by the letter "D" In FIG. 17, electron-donating groups including one or more of hydrogen, amine, OH, SH, ether, hydrocarbon, substituted hydrocarbon, and functional groups with at least one hetero atom, such as B, Si, I, N, O, S, P;
   a conjugated connecting unit linking the rotor and stator portion together, represented in FIG. 17 by the symbols "$G_1$" and "$G_2$;"
   atoms or atomic subunits that form five-member ring systems, indicated in FIG. 19 by the letters "Y" and "Z," including: N, S, O, P, NH, N-alkyl, hydrocarbon, and substituted hydrocarbon; and
   leaving groups in the aromatic ring during nucleophilic substitution or metal catalyzed cross-coupling reaction, represented in FIG. 19 by the symbols "$X_1$," "$X_2$," "$X_3$," "$X_4$," "$X_5$," and "$X_6$," including Cl, Br, I, F, O—$SO_3CF_3$, and O—$SO_3$-Aryl, wherein the aryl group can be a phenyl group or substituted hydrocarbon.

* * * * *

UNITED STATES PATENT AND TRADEMARK OFFICE
CERTIFICATE OF CORRECTION

PATENT NO. : 7,390,540 B2  Page 1 of 1
APPLICATION NO. : 10/896182
DATED : June 24, 2008
INVENTOR(S) : Patricia A. Beck et al.

It is certified that error appears in the above-identified patent and that said Letters Patent is hereby corrected as shown below:

On the title page, in field (56), under "Other Publications", in column 2, line 3, delete "Characteristics" and insert -- Characterisation --, therefor.

In column 13, line 66, insert -- represent leaving groups in the aromatic ring during nucleophilic substitution or -- before "metal".

In column 14, line 6, delete "$G_{1-G2}$" and insert -- $G_1$-$G_2$ --, therefor.

In column 16, line 13, in Claim 7, delete "1903" and insert -- 1906 --, therefor.

Signed and Sealed this

Twenty-fifth Day of November, 2008

JON W. DUDAS
*Director of the United States Patent and Trademark Office*